(12) United States Patent
Kifuku et al.

(10) Patent No.: US 6,380,706 B1
(45) Date of Patent: Apr. 30, 2002

(54) ELECTRIC POWER STEERING DEVICE

(75) Inventors: Takayuki Kifuku; Hiroshi Nishimura; Katsuhiko Ohmae; Munenori Yamamoto, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/640,274

(22) Filed: Aug. 17, 2000

(30) Foreign Application Priority Data

May 8, 2000 (JP) ............................................ 12-134168

(51) Int. Cl.[7] ............................................... H02K 23/68
(52) U.S. Cl. ...................... 318/434; 318/800; 318/805; 318/798; 318/812; 318/606; 318/438
(58) Field of Search ................................. 318/434, 800, 318/805, 798, 812, 606, 438; 180/79.1

(56) References Cited

U.S. PATENT DOCUMENTS 4,992,944 A * 2/1991 Noto et al. ................. 180/79.1
5,521,482 A * 5/1996 Lang et al. .................. 318/800
6,046,893 A * 4/2000 Heravi ........................ 318/434

* cited by examiner

Primary Examiner—Karen Masih
(74) Attorney, Agent, or Firm—Sughrue Mion, PLLC

(57) ABSTRACT

An electric power steering device constructed to detect a steering force by a driver and a vehicle speed respectively by a torque sensor and a vehicle speed sensor, set a steering force assisting current for a motor by a steering force assisting current setter using the detected steering force and the detected vehicle speed, set an upper limit value of a motor current by a motor current upper limit value setter based on a power function of a deviation between the set steering force assisting current and a predetermined motor current reference value, and perform overheat protection by setting an upper limit of a motor current applied by a motor driving circuit based on an integrated value of the motor current squared, whereby a problem of an insufficient steering assisting force when stationary steering is repeated many times while parking in a garage in a narrow parking area is solved.

20 Claims, 19 Drawing Sheets

ELECTRIC POWER STEERING DEVICE

BACKGROUND OF THE INVENTION

1. Field of the Invention

The present invention relates to an electric power steering device, assisting a steering force applied by a driver of an automobile and so on by a motor.

2. Discussion of Background

Various methods of protecting an electric power steering device assisting a steering force, applied by a driver, by a motor are conventionally devised. FIGS. 16 and 17 illustrate a conventional electric power steering device disclosed in Japanese Utility Model No. 2586020.

FIG. 16 is a control block chart illustrating the conventional electric power steering device.

In FIG. 16, numerical reference 1 designates a torque sensor detecting a steering force, applied by a driver; numerical reference 2 designates a speed sensor detecting a speed of a vehicle; numerical reference 3 designates a microprocessor; numerical reference 4 designates a motor driving circuit; numerical reference 5 designates a motor, driven by the motor driving circuit 4 to generate a steering assisting force; and numerical reference 6 designates a motor current detecting means detecting a current flowing through the motor 5. Numerical reference 31 designates a steering force assisting current setting means determining the motor current in order to reduce the steering force by the driver; numerical reference 32 designates an inertia compensating current setting means determining the motor current in order to reduce an influence of a moment of inertia of the motor; and numerical reference 33 designates an upper limit motor current setting means determining an upper limit of the motor current in order to protect the motor driving circuit 4 from overheat and to maintain the motor current, wherein numerical references 31 through 33 are realized by a software in the microprocessor 3.

FIG. 17 illustrates the upper limit motor current of the conventional electric power steering device.

Next, an operation of the conventional electric power steering device will be described.

When the driver steers a steering wheel, a steering force is detected by a torque sensor 1, and a signal is inputted in the microprocessor 3. The microprocessor 3 sets the steering force assisting current in the steering force assisting current setting means 31 to obtain an appropriate steering force based on a vehicle speed detected by the vehicle speed sensor 2 and the steering force. Further, the inertia compensating current is set by the inertia compensating current setting means 32 in order to reduce an influence of the moment of inertia of the motor and to improve a steering feeling. The steering force assisting current is limited to be the upper limit value or less, wherein the upper limit value is determined in accordance with a characteristic illustrated in FIG. 17 in response to an integrated value of the motor current, detected by the motor current detecting means 6, squared. Thus limited steering force assisting current and the inertia compensating current are added and fed for a feedback control so that the added value and the detected value of the motor current by the motor current detecting means 6 match. The motor 5 is driven by the motor driving circuit 4.

In the conventional electric power steering device, a squared value of the current has a close relationship with a calorific value and is appropriate for an index of overheat protection. The upper limit of the motor current is determined in response to the integrated value of the motor current squared in the motor current upper limit value setting means 33. However, a loss in heat generating portions of the motor and the controller is analoguous to a power function of the current, and an exponent of the power function is between the first power and the second power. Accordingly, especially in a large current range, when the overheat protection is conducted using the index of the current squared, there is a problem that an overheat is excessively protected. As a result, in case of parking a vehicle in a garage located in a narrow parking area by stationarily steering the steering wheel, there are problems that the steering assisting force becomes small, and the steering force by the driver is increased.

Another conventional device, which determines an upper limit of a motor current in response to an integrated value of the motor current to the first power, is also known. In this case, as disclosed in Japanese Utility Model No. 2586020, the upper limit value is not rational, and it is necessary to design the motor driving circuit 4 with a margin.

Hereinbelow, another conventional device will be described with reference to the figures.

FIG. 18 illustrates an equivalent circuit of a generally used d.c. motor.

In FIG. 18, numerical reference 7 designates a resistance of an armateur; numerical reference 8 designates an inductance of the armateur; and numerical reference 9 designates a resistance of a brush.

FIG. 19 illustrates a voltage drop in the brush of the d.c. motor illustrated in FIG. 18.

In FIG. 18, provided that the motor current is represented by Im, and the voltage drop in the brush is represented by Vbr, a copper loss Pm of the motor is expressed by the following equation.

$$Pm = Ra * Im^2 + Vbr * Im, \qquad \text{(Equation 1)}$$

where

Pm denotes the copper loss of the motor (W);

Ra denotes the resistance of the armateur ($\Omega$);

Im denotes the current of the armateur (A); and

Vbr denotes the voltage drop in the brush (V).

As illustrated in FIG. 19, the voltage drop Vbr in the brush increases as the current Im of the armateur increases. When the current Im of the armateur becomes a predetermined value Im1 or more, the voltage drop is saturated at a predetermined value Vbr1. In a large current range that current of armateur Im> predetermined value Im1, where a heat from the motor causes problems, the voltage drop Vbr in the brush becomes constant irrespective of the current Im of the armateur.

From FIG. 19 and Equation 1, it is possible to regard the copper loss Pm of the motor a sum of a term in proportion to the current Im squared of the amateur and a term in proportion to the current Im of the armateur to the first power. Therefore, the copper loss Pm of the motor is a power function of the current Im of the armateur as follows.

$$Pm \approx C1 * Im^{n1}, \qquad \text{(Equation 2)}$$

Where $1 \leq n1 \leq 2$, and

C1 denotes an arbitrary constant.

Thus the copper loss Pm of the motor is analoguous to Equation 2.

FIG. 20 illustrates the motor driving circuit of a conventional electric power steering controller.

In FIG. 20, numerical reference 4 designates a motor driving circuit composed of MOSFET Q1 through Q4; numerical reference 5 designates a motor; and numerical reference 10 designates a battery.

FIG. 21 is a graph illustrating a waveform of a motor current of the motor driving circuit illustrated in FIG. 20, wherein MOSFET Q1 and Q4 are driven for PWM, and MOSFET Q2 and Q3 are turned off.

FIG. 22 illustrates a voltage drop of a parasitic diode MOSFET of the motor driving circuit in the conventional electric power steering device.

Next, an operation of the motor driving circuit illustrated in FIG. 20 will be described. In a duration that MOSFET Q1 and Q4 are turned on, the motor current flows through a passage I1. In a duration that MOSFET Q1 and Q4 are turned off, parasitic diodes of MOSFET Q2 and Q3 are turned on, whereby the motor current flows through a passage I2. Provided that losses of MOSFET Q1 through Q4 respectively are P1 through P4, and a switching loss is ignored, a loss Pd of the motor driving circuit 4 is expressed by following equations.

$$Pd = P1 + P2 + P3 + P4 \quad \text{(Equation 3)}$$

$$P1 = P4 = \alpha * Ron * Im^2 \quad \text{(Equation 4)}$$

$$P2 = P3 = (1-\alpha) VF * Im \quad \text{(Equation 5)}$$

where

Pd denotes a loss (W) without the switching loss of the motor driving circuit;

P1 denotes the loss (W) without the switching loss of MOSFET Q1;

P2 denotes the loss (W) without the switching loss of MOSFET Q2;

P3 denotes the loss (W) without the switching loss of MOSFET Q3;

P4 denotes the loss (W) without the switching loss of MOSFET Q4;

$\alpha$ denotes a flow rate of a current through MOSFET Q1 and Q4;

Ron denotes a resistance ($\Omega$) at time of turning on MOSFET;

Im denotes a motor current (A), equals to I1 and I2; and

VF denotes a voltage (V) of a parasitic diode of MOSFET in a direction of easy flow.

As illustrated in FIG. 22, the voltage VF of the parasitic diode of MOSFET in the direction of easy flow increases as the motor current Im increases. When the motor current In becomes a predetermined value Im2 or more, the voltage VF saturates at a predetermined value VF1. In other words, in a large current range of Im>Im2, where a heat of the motor driving circuit 4 becomes a problem, the voltage VF of the parasitic diode of MOSFET in the directon of easy flow is constant regardless of the motor current Im.

In reference of FIG. 22 and Equations 3 through 5, the loss Pd without the switching loss of the motor driving circuit can be regarded as a sum of a term in proportion to the motor current Im squared and a term in proportion to the motor current Im to the first power. Therefore, the loss Pd without the switching loss of the motor driving circuit is approximately expressed as a power function of the motor current Im as follows.

$$Pd \approx C2 * Im^{n2}, \quad \text{(Equation 6)}$$

Where $1 \leq n2 \leq 2$; and

C2 denotes an arbitrary constant.

As described, the losses of the motor and the controller approximate to power functions of the current, and indices of exponential function are between the first power and the second power. Therefore, overheat protection is excessive when the current to the second power is used as an indicator of the heat.

Further, when the upper limit of the motor current is determined in response to the integrated value of the motor current to the first power, setting of the upper limit value is not rational, and it is necessary to give a margin in designing the motor driving circuit 4.

SUMMARY OF THE INVENTION

It is an object of the present invention to solve the above-mentioned problems inherent in the conventional technique and to provide an electric power steering device, which is provided with appropriate overheat protection to maintain a sufficient steering assisting force even when stationary steering is repeated.

According to a first aspect of the present invention, there is provided an electric power steering device assisting a steering force by a motor, the electric power steering device comprising a motor current upper limit value setting means setting an upper limit value of a motor current based on a power function of the motor current, and indices of an exponential function of the power function are in a range of between 1 and 2.

According to a second aspect of the present invention, there is provided an electric power steering device assisting a steering force by a motor, the electric power steering device comprising a motor current upper limit value setting means for setting an upper limit value of a motor current based on a power function of a deviation between the motor current and a motor current reference value.

According to a third aspect of the present invention, there is provided an electric power steering device assisting a steering force by a motor, the electric power steering device comprising a motor current upper limit value setting means for setting an upper limit value of a motor current based on a deviation between a power function of the motor current and a reference value of the power function of the motor current.

According to a fourth aspect of the present invention, there is provided the electric power steering device, wherein indices of an exponent of the power function are in a range between 1 and 2.

According to a fifth aspect of the present invention, there is provided the electric power steering device further comprising a motor current detecting means detecting the motor current, wherein the motor current is a current detected by the motor current detecting means.

According to a sixth aspect of the present invention, there is provided the electric power steering device, wherein the power functions are approximate to a polynomial.

According to a seventh aspect of the present invention, there is provided the electric power steering device, wherein the power functions are approximate to a polygonal line graph.

According to an eighth aspect of the present invention, there is provided the electric power steering device further comprising a motor driving circuit, which drives the motor in a plurality of moods, wherein constants of the power functions are switched in response to driving modes of the motor driving circuit.

According to a ninth aspect of the present invention, there is provided the electric power steering device, wherein the power functions are delayed in time by a predetermined function to set the upper limit value of the motor current.

According to a tenth aspect of the present invention, there is provided the electric power steering device further comprising a temperature detecting means detecting temperatures of portions related to a temperature increment, wherein the motor current upper limit value setting means adjusts the upper limit value of the motor current in response to the temperatures detected by the temperature detecting means.

According to an eleventh aspect of the present invention, there is provided the electric power steering device, wherein the motor current upper limit value setting means operates a plurality of upper limit values of the motor current using a plurality of power functions, and selects one of the plurality of upper limit values of the motor current.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 15 as follows, wherein the same numerical references are used for the same or similar portions and description of these portions is omitted.

Embodiment 1

Figure 1:
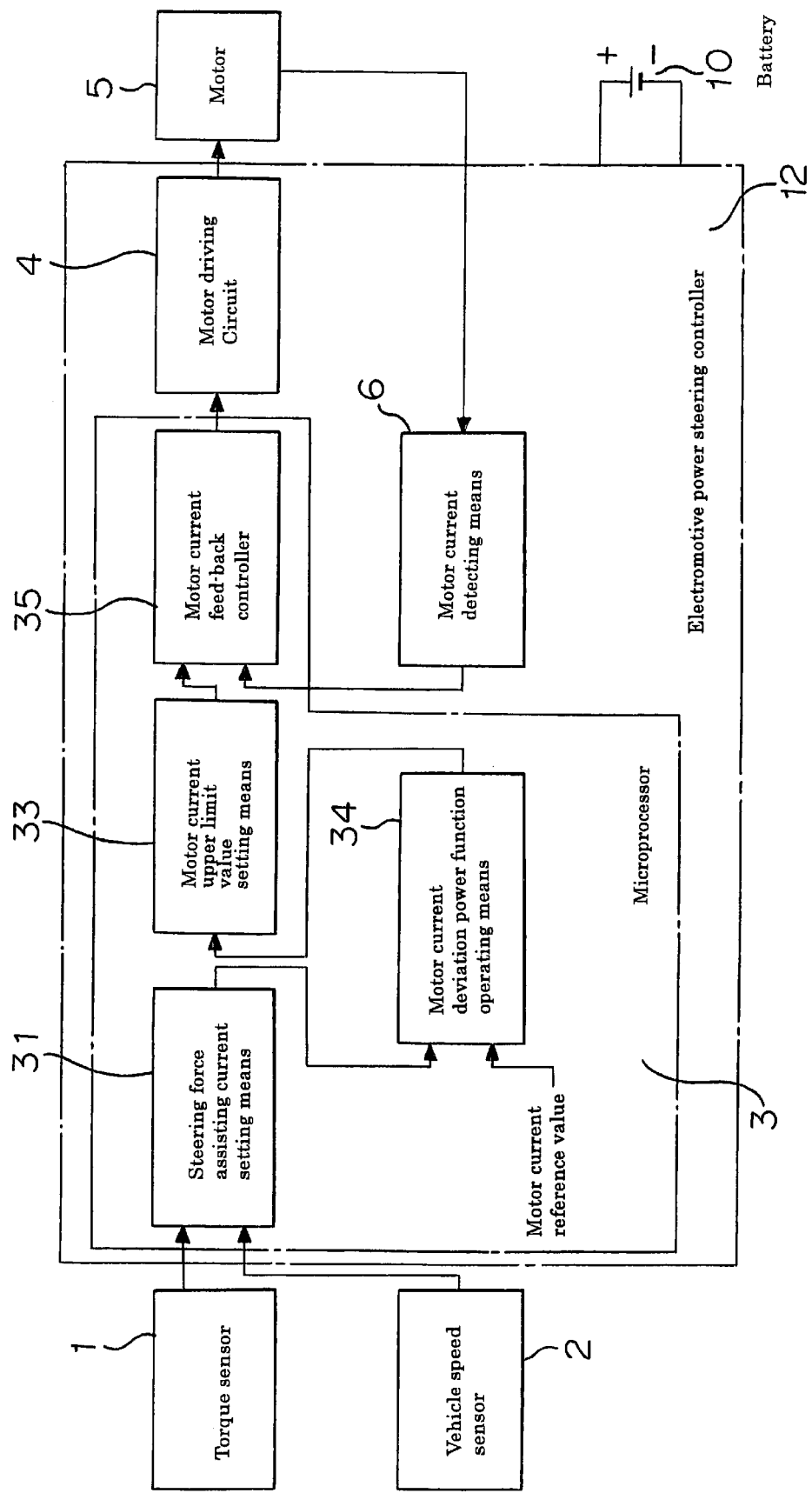
FIG. 1 illustrates a structure of an electric power steering device according to Embodiment 1 of the present invention.

In FIG. 1, numerical reference 1 designates a torque sensor detecting a steering force by a driver; numerical reference 2 designates a vehicle speed sensor detecting a speed of a vehicle; numerical reference 3 designates a microprocessor; numerical reference 4 designates a motor driving circuit; numerical reference 5 designates a motor driven by the motor driving circuit 4 and generating a steering assisting force; and numerical reference 6 designates a motor current detecting means detecting a current flowing through the motor 5. Numerical reference 10 designates a battery; and numerical reference 12 designates an electric power steering controller, to which the torque sensor 1 and the vehicle speed sensor 2 are connected and provide input signals. The motor 5 is connected to the electric power steering controller 12 as a load, and the battery 10 is connected as a power source. Numerical reference 31 designates a steering force assisting current setting means determining the motor current in order to reduce the steering force by the driver in response to the steering force detected by the torque sensor 1. Numerical reference 33 designates a motor current upper limit value setting means determining an upper limit of the motor current in order to protect the motor current and the motor driving circuit 4 from overheat. Numerical reference 34 designates a motor current deviation power function operating means operating a power function of a deviation between a steering force assisting current and a motor current reference value. Numerical reference 35 is a motor current feedback controller determining a voltage applied to the motor so that the steering force assisting current having the upper limit value limited by the motor current upper limit value setting means 33 matches with the motor current detected by the motor current detecting means 6. The motor current upper limit value setting means 33 operates the motor current upper limit value from the motor current deviation power function and limits the steering force assisting current to be a predetermined upper limit value or less.

The electric power steering controller 12 comprises the microprocessor 3, the motor driving circuit 4, and the motor current detecting means 6, wherein the steering force assisting current setting means 31, the motor current upper limit value setting means 33, the motor current deviation power function operating means 34, and the motor current feedback controller 35 are installed in the microprocessor 3 in the form of software. An instruction applying the motor current from the microprocessor 3 is subjected to a power amplification in the motor driving circuit 4 in order to drive the motor 5.

Figure 2:
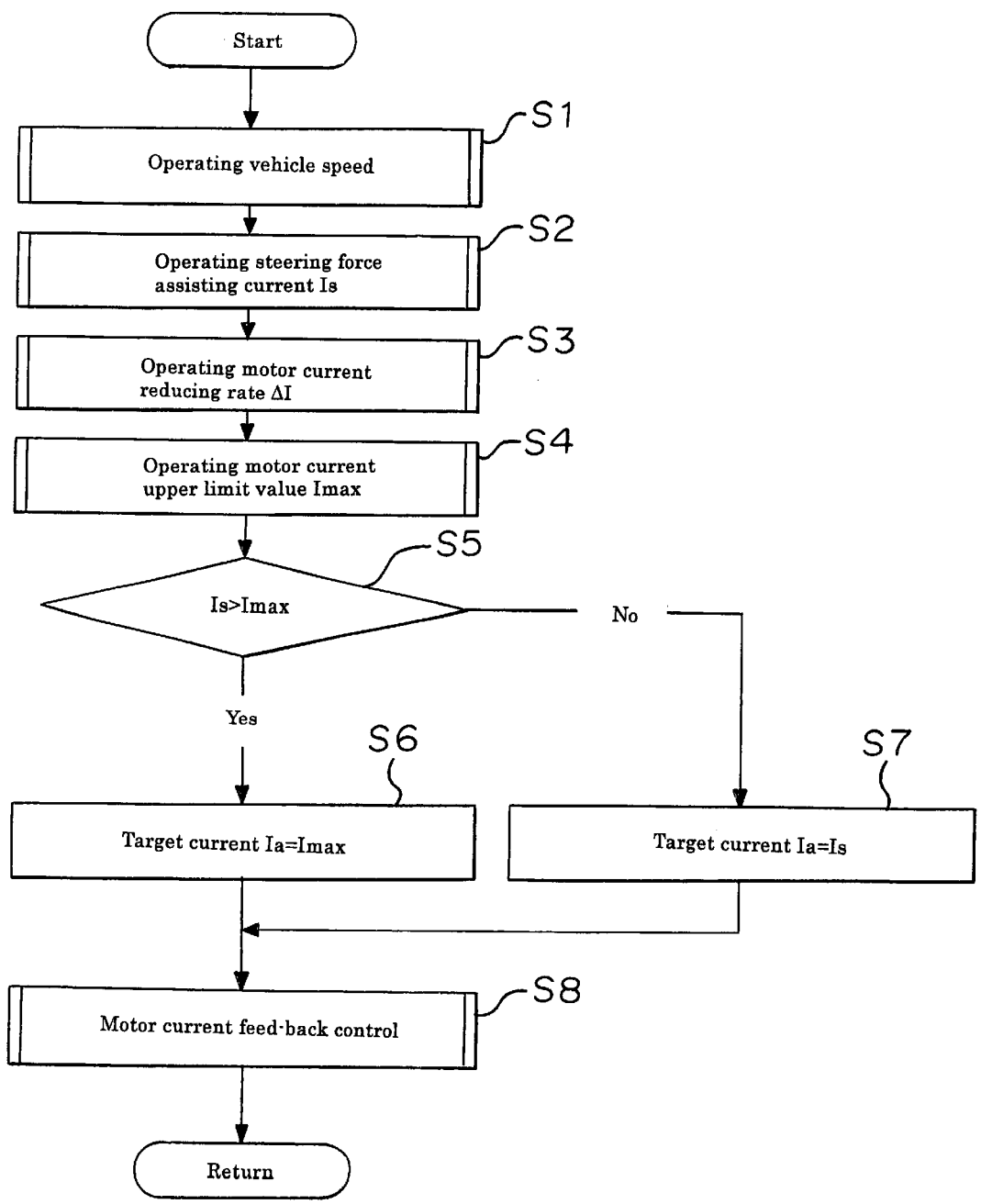
FIG. 2 is a flow chart illustrating an operation of a software for the electric power steering device according to Embodiment 1 of the present invention.

FIG. 2 is a flow chart illustrating the operation of the software in the electric power steering device according to Embodiment 1 of the present invention.

Figure 3:
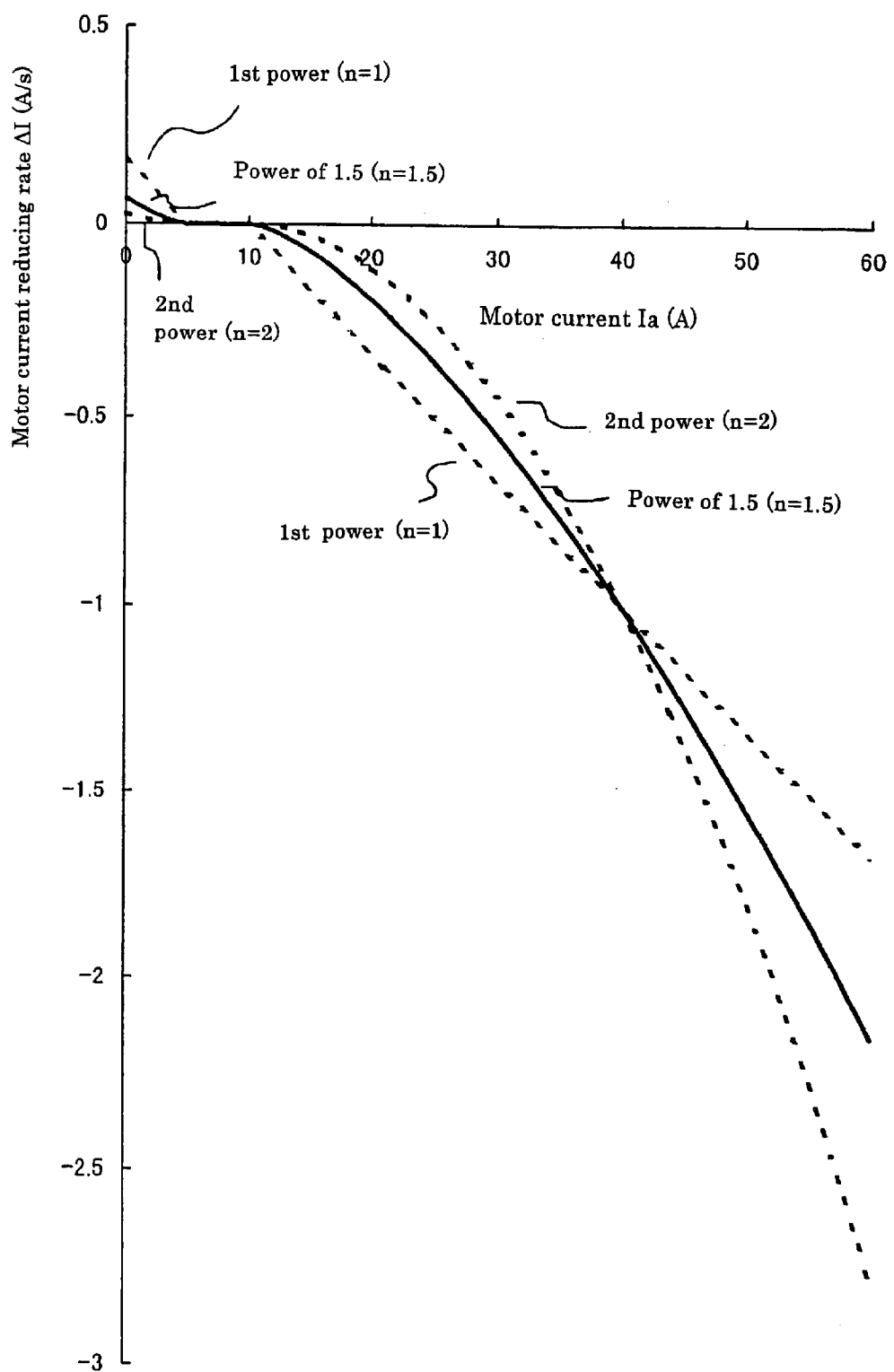
FIG. 3 is a graph showing a power function of a deviation of a motor current in the electric power steering device according to Embodiment 1 of the present invention.

FIG. 3 illustrates a graph of the motor current deviation power function of the electric power steering device according to Embodiment 1 of the present invention.

Figure 4:
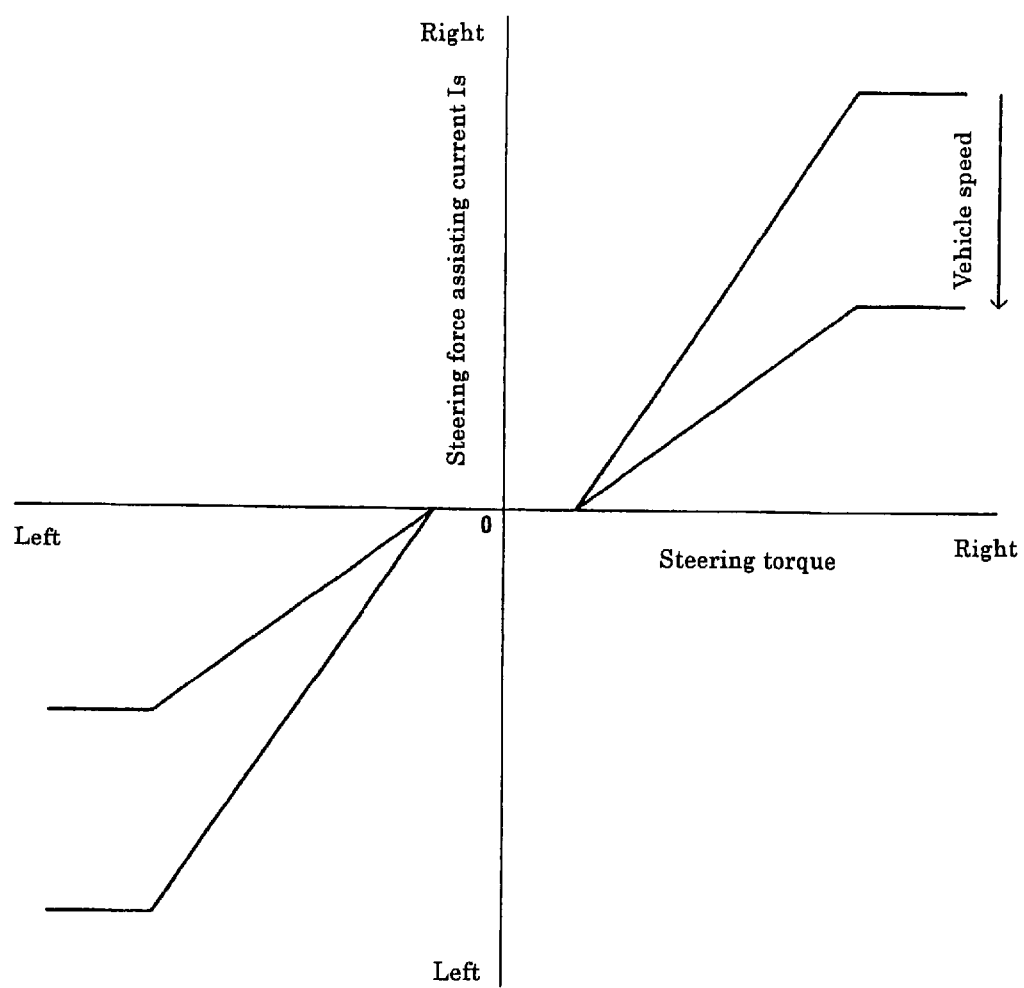
FIG. 4 is a graph showing characteristics of a steering force assisting current of the electric power steering device according to Embodiment 1 of the present invention.

FIG. 4 is a graph illustrating the characteristics of the steering force assisting current of the electric power steering device according to Embodiment 1 of the present invention.

Figure 5:
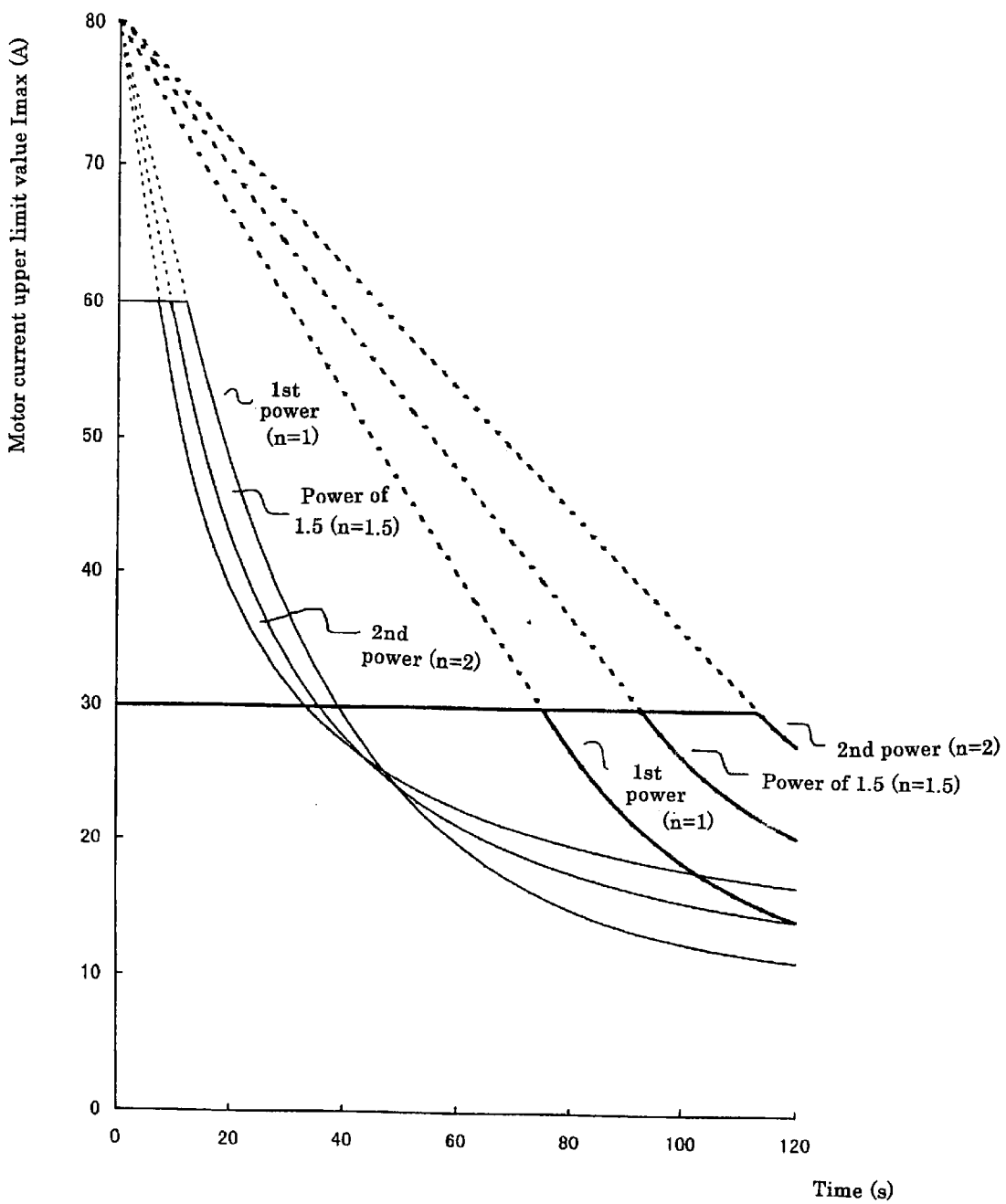
FIG. 5 is a graph illustrating characteristics of an overheat protection of the electric power steering device according to Embodiment 1 of the present invention.

FIG. 5 is a graph illustrating characteristics of the overheat protection of the electric power steering device according to Embodiment 1 of the present invention.

Hereinbelow, an operation of the electric power steering device according to Embodiment 1 will be described in reference of FIGS. 2 through 5 based on a procedure illustrated in FIG. 2. A program processing as in FIG. 2 is read during each constant cycle by an upper program controlling an execution cycle.

In Step S1, the vehicle speed is operated. In Step S2, the steering force assisting current Is is operated from the vehicle speed operated in Step S1 and the steering torque by a driver detected by the torque sensor 1 in accordance with, for example, the characteristics illustrated in FIG. 4. Steps S1 and S2 correspond to an operation of the steering force assisting current setting means 31 illustrated in FIG. 1.

In Step S3, a motor current reducing rate I is operated from a target current Ia, obtained in a previous process in Steps S5 through S7, and a predetermined motor current reference value Iref as the motor current deviation power function. In Step S4, the upper limit value of the motor current is operated from the motor current reducing rate I, operated in Step S3. In Steps S5 through S7, the steering force assisting current, obtained in Step S2, is limited to be the upper limit value of the motor current, operated in Step S4, or less, and the steering force assisting current becomes the target motor current Ia.

Operations of Steps S3 through S7 will be described in detail.

In Step S3, the motor current reducing rate $\Delta I$ for the overheat protection is obtained as a power function of the deviation between the target motor current Ia and the motor current reference value Iref, based on, for example, the following equation.

$$\Delta I = C3 * \text{sgn}(\text{Iref} - \text{Ia}(k-1)) * (|\text{Iref} - \text{Ia}(k-1)|)^n, \quad \text{(Equation 7)}$$

where

C3 denotes an arbitrary constant; and

Ia(k−1) denotes a previously obtained target motor current.

For example, Equation 7 is solved by looking up in a table of data the results of the operation previously obtained and stored in read-only-memory (ROM).

FIG. 3 illustrates an example of the operation of the motor current reducing rate I when Iref is 10 A, maximum current is 60 A, indices n of the exponent are 1, 1.5, and 2, and C3 is selected to make I the same when the motor current is 40 A. In FIG. 3, when the reducing rate is determined based on the deviation to the first power, the reducing rate is larger when the motor current is small and smaller when the motor current is larger than a case where the reducing rate is determined based on the deviation to the power of 1.5. Therefore, when the reducing rate is determined based on the deviation to the first power, and a small reducing rate is set to obtain a sufficient assisting force when the current is small, it is necessary to design a circuit having a margin sufficient for withstanding heat generated when the current is large.

Further, when the reducing rate is determined based on the deviation to the second power, the reducing rate is smaller when the current is small and larger when the current is large than a case where the reducing rate is determined based on the deviation to the power of one-point-five. Therefore, when the reducing rate is determined based on the deviation to the second power, and the reducing rate is set large for withstanding heat generated when the current is small, the reducing rate of the large current is excessive, whereby a sufficient assisting force is not obtainable when the large current is necessary, for example, for stationary steering.

In Step S4, the motor current upper limit value Imax is obtained for the overheat protection from the motor current reducing rate $\Delta I$, obtained in Step S3, in accordance with, for example, the following equations.

$$\text{Imax\_ovh}(k) = \text{Imax\_ovh}(k-1) + \Delta I \quad \text{(Equation 8)}$$

$$\text{Imax}(k) = \min(\text{Imax\_sys}, \text{Imax\_ovh}) \quad \text{(Equation 9)}$$

In the above equations, Imax_ovh denotes the motor current upper limit value obtained from an integration of $\Delta I$. Imax_sys denotes the motor current upper limit value determined in designing a system. By making an initial value of Imax_ovh smaller than Imax_sys, the upper limit value of the motor current is Imax_sys in a predetermined time until Imax1=Imax2 is established after starting to reduce Imax1.

FIG. 5 illustrates an example that the motor current upper limit value Imax is operated in accordance with the reducing rate illustrated in FIG. 3 when the initial value of Imax_ovh is 80 A and Imax_sys is 60 A. A broken line represents Imax_ovh, and a solid line represents Imax. Further, a fine line represents a case that a demand value of the steering force assisting current Is is 60 A, and a thick line represents a case that the demand value is 30 A. When the motor current upper limit value is determined based on the deviation to the first power, in comparison with the case that the motor current upper limit value is determined based on the deviation to the power of one-point-five, the motor current is limited earlier than in the case that the demand value of the steering force assisting current is 30 A, and the limitation of the motor current is retarded when the demand value is 60 A. Accordingly, by determining the reducing rate based on the deviation to the first power to provide a sufficient assisting force when the current is small, it is necessary to design the circuit having a margin for withstanding the heat of the large current.

On the other hand, when the motor current upper limit value is determined based on the deviation to the second power, in comparison with the case that the motor current upper limit value is determined based on the deviation to the power of one-point-five, the limitation of the motor current is retarded when the demanded value of the steering force assisting current is 30 A, and the motor current is rapidly limited when the demanded value of the steering force assisting current is 60 A. Therefore, when the motor current upper limit value is determined based on the deviation to the second power so that the circuit can withstand a heat of the small current, the reducing rate of the large current is large enough to provide a sufficient assisting force under a condition requiring the large current such as stationary steering.

Accordingly, by setting the index of exponent function within a range of 1<index<2, an appropriate overheat protection is obtainable.

For example, the motor current reference value Iref is selected as a current which can be continuously applied. According to Equations 8 and 9, the motor current upper limit value Imax converges on the motor current reference value Iref as time lapses. Therefore, by setting the values and parameters as described, the motor and the controller are not broken even if stationary steering is repeated for a long time.

In Steps S5 through S7, the steering force assisting current Is obtained is clipped to be the motor current upper limit value Imax, obtained in Step S2, or less, whereby the motor target current Ia is obtained.

As described, in Steps S3 through S7, the motor current upper limit value is set in response to the motor current, and the motor target current is limited to be the upper limit value or less, whereby the electric power steering controller 12 and the motor 5 are subjected to the overheat protection. Step S3 corresponds to the motor current deviation power function operating means 34 illustrated in FIG. 1, and the processes of Steps S4 through S7 correspond to the motor current upper limit value setting means 33.

Finally, in Step S8, a voltage applied to the motor 5 is determined so that the motor target current obtained in Step S5 is in agreement with the detected motor current, wherein, for example, a proportional integral control or the like is used. Thereafter, the motor 5 is driven by the motor driving circuit 4. Step S8 corresponds to a process by the motor current feedback controller 35, illustrated in FIG. 1.

As described, according to Embodiment 1, the appropriate overheat protection is provided, and the steering assisting force is applied in the large current range through the small current range without leaving an allowable dissipation.

Although, in Embodiment 1, Equation 7 as previously operated is stored in ROM, and the motor current reducing rate $\Delta I$ is obtained by looking up in the table, these procedures may be processed by operating using approximate expression.

According to this method, it is possible to sufficiently operate the motor current reducing rate using a microprocessor having a low cost, and the amount of data held in ROM can be reduced.

Further, Equation 7 may be approximately represented by polygonal lines. In this case, the amount of data held in ROM in, for example, a data table can be reduced.

In Embodiment 1, although the motor current upper limit value Imax is operated based on the target motor current Ia, the motor current upper limit value Imax may be operated based on the detected motor current obtained by the motor current detecting means 6. In this case, for example, when a deviation between the target current and the detected current is large by an outer disturbance such as a back electromotive force, the appropriate overheat protection can be provided.

Further, as in the conventional device, a method of improving steering feeling, for example, inertia compensation, may be used. In this case, the motor current upper limit value may be operated based on a sum of the steering force assisting current and an inertia compensating current, or based on only the steering force assisting current. Further, an upper limit may be set for the sum of the steering force assisting current and the inertia compensating current, or for only the steering force assisting current.

Further, although the upper limit value is set in the target value of the motor current feedback control, the upper limit value is equivalent to an upper limit value of the voltage applied to the motor 5. In this case, the motor current can be controlled by an open loop.

Embodiment 2

Although, in Embodiment 1, the motor current reducing rate for the overheat protection is obtained as the power function of the deviation between the target motor current and the motor current reference value in Equation 7, the motor current reducing rate is obtained from a deviation between a power function of the motor current and a motor current power function reference value in Embodiment 2.

Because structures of a hardware and a program of an electric steering controller are the same as those in Embodiment 1, a description is omitted, and only a method of operating a motor current upper limit value is described.

Embodiment 2 will be described in reference of FIG. 2.

Figure 6:
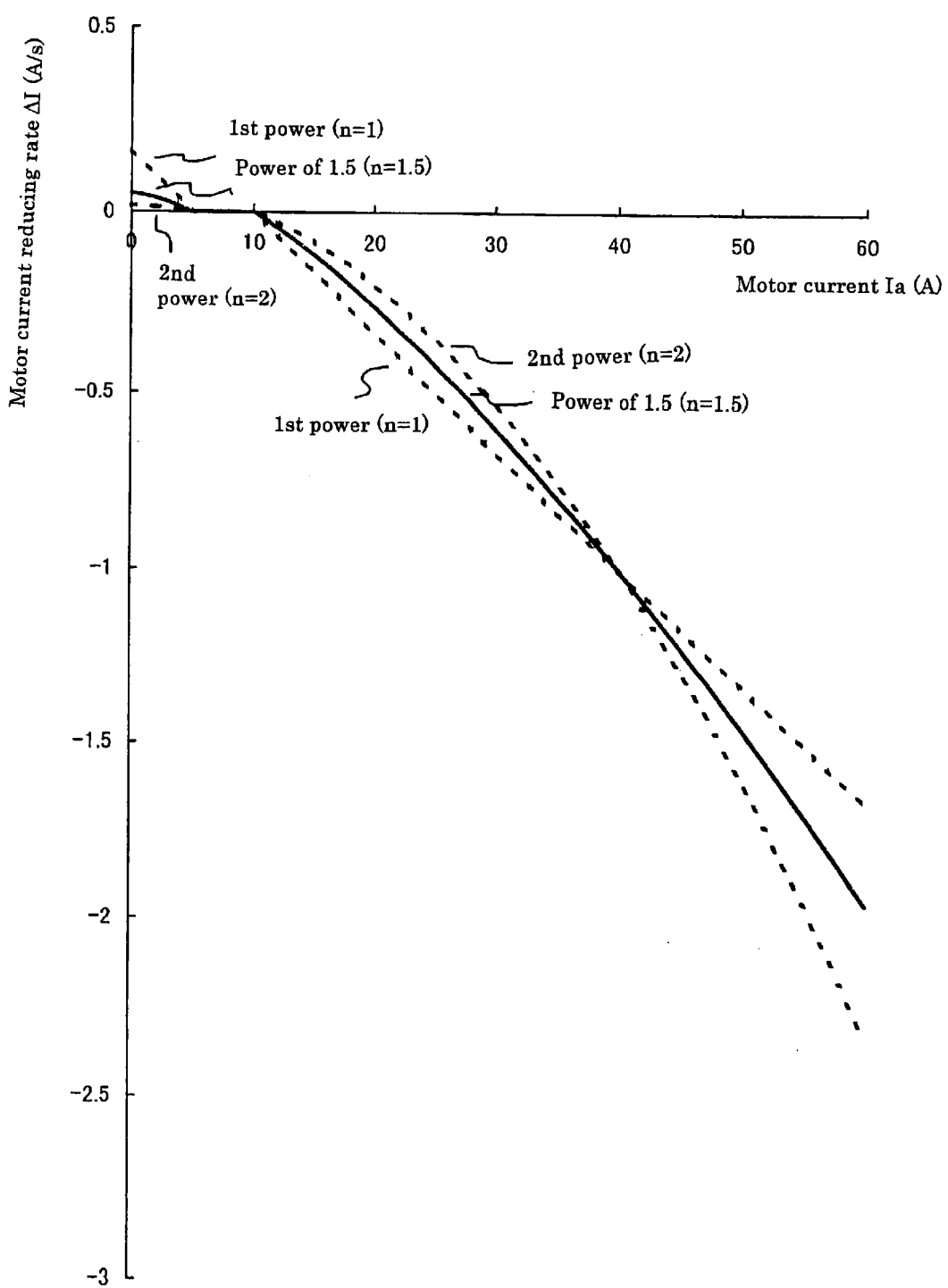
FIG. 6 is a graph illustrating a power function of a deviation of a motor current in an electric power steering device according to Embodiment 2 of the present invention.

FIG. 6 is a graph explaining the motor current deviation power function of an electric power steering device according to Embodiment 2 of the present invention.

Figure 7:
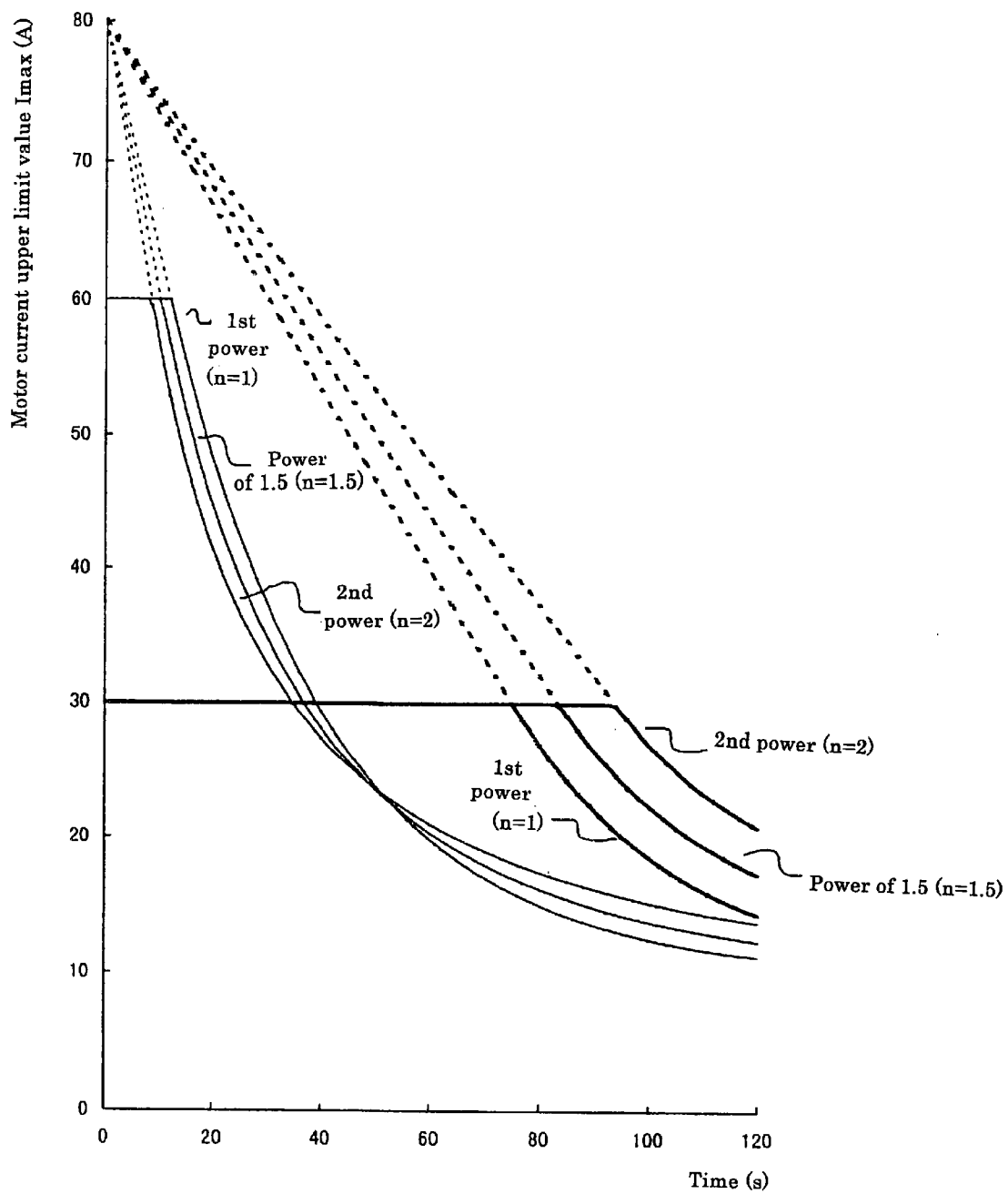
FIG. 7 is a graph illustrating characteristics of an overheat protection of the electric power steering device according to Embodiment 2 of the present invention.

FIG. 7 is a graph explaining an overheat protection characteristic of the electric power steering device according to Embodiment 2 of the present invention.

In Embodiment 2, in Step S3 of the flow chart illustrated in FIG. 2, the motor current reducing rate $\Delta I$ for overheat protection is obtained from the deviation of the power function of the motor current Ia and the motor current reference value Iref in accordance with, for example, the following equation.

$$\Delta I = C4 * (Iref^n - Ia(k-1)^n), \quad \text{(Equation 10)}$$

where reference C4 denotes an arbitrary constant, and reference Ia(k-1) denotes a previous target motor current.

Equation 10 may be held in ROM as a data table or operated using a polynomial approximation.

FIG. 6, illustrates an example of operation of the motor current reducing rate $\Delta I$ when the motor current reference value Iref is 10 A, a maximum current is 60 A, and C4 is selected so that $\Delta I$ at the time of a motor current of 40 A is the same as that in Embodiment 1.

Further, FIG. 7 illustrates an example that a motor current upper limit value is operated from the motor current reducing rate obtained in Equation 10 in a manner similar to that in Embodiment 1. In Embodiment 2, a motor current reducing rate characteristic similar to that in Embodiment 1 is obtainable as known from FIGS. 6 and 7.

If the motor current reference value Iref is selected so as to be continuously applied in a manner similar to that in Embodiment 1, even though stationary steering is repeated for a long time, a motor and a controller are protected so as not to be broken.

In Embodiment 2, the operation is simplified in comparison with Embodiment 1, and a microprocessor 3, of which cost is lower than that in Embodiment 1, can be used to obtain an effect similar to that in Embodiment 1.

Embodiment 3

In Embodiments 1 and 2, the deviation between the predetermined motor current reference value and the motor current is subjected to the feedback so as to gradually reduce the motor current upper limit value to the motor current reference value. In Embodiment 3, the motor current upper limit value is positively obtained from the motor current.

Figure 8:
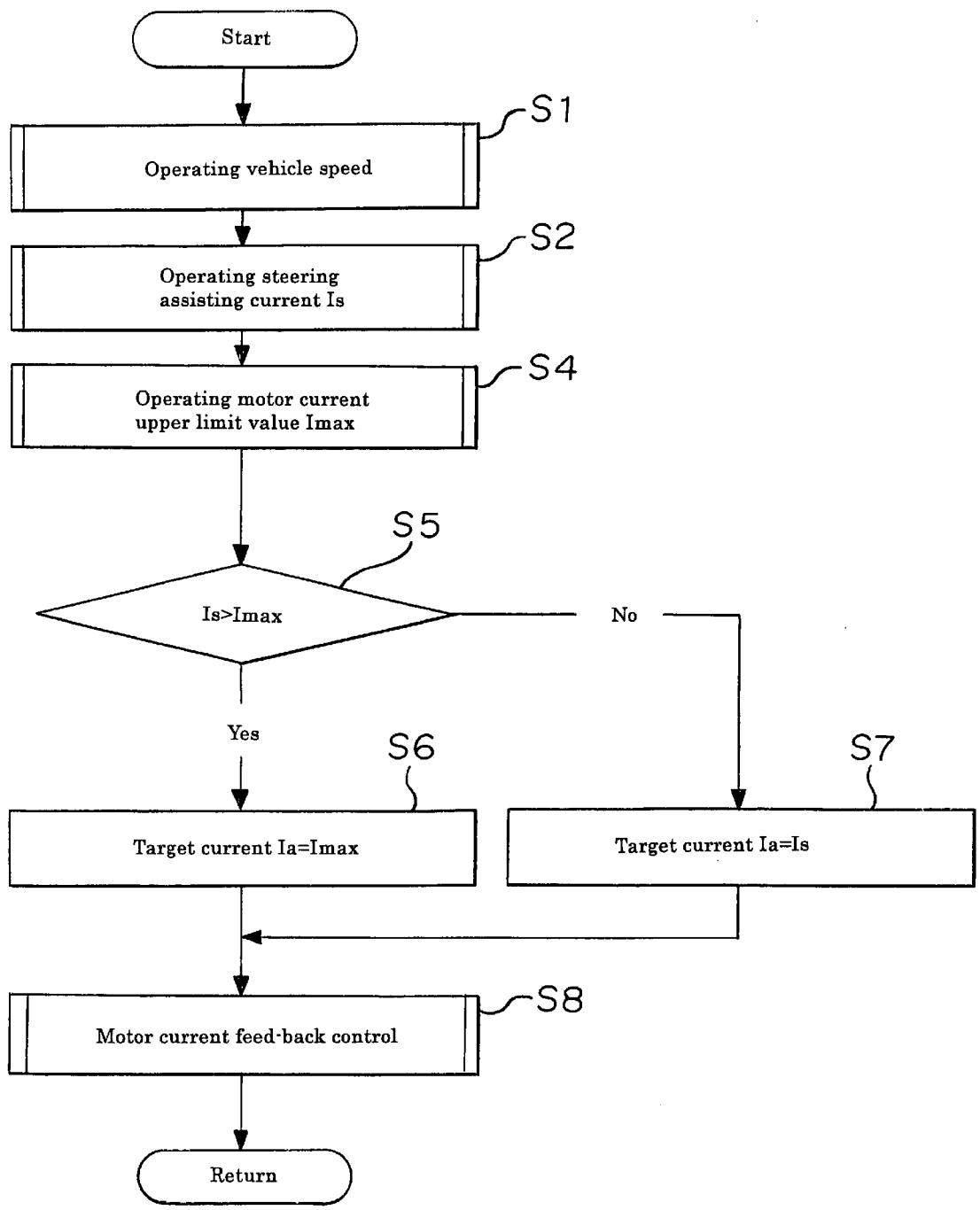
FIG. 8 is a flow chart illustrating an operation of a software for an electric power steering device according to Embodiment 3 of the present invention.

FIG. 8 is a flow chart illustrating an operation of software of an electric power steering device according to Embodiment 3 of the present invention.

Figure 9:
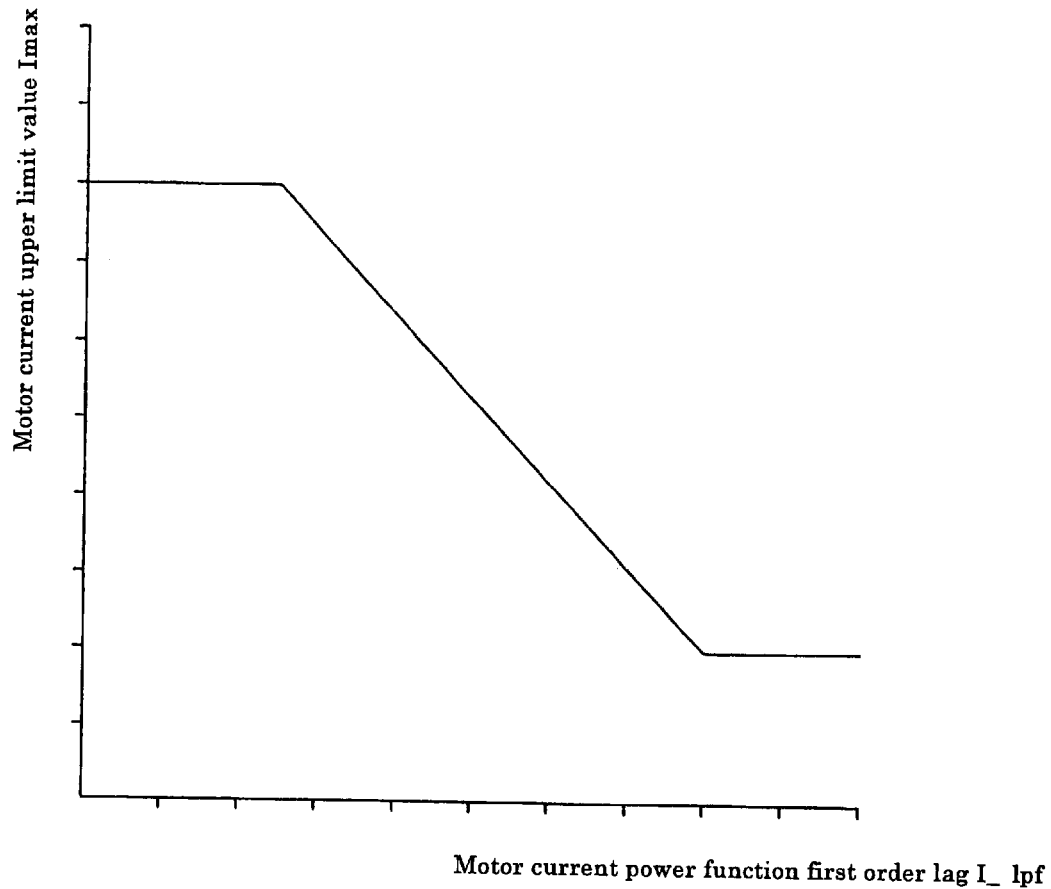
FIG. 9 is a graph illustrating characteristics of an overheat protection of the electric power steering device according to Embodiment 3 of the present invention.

FIG. 9 illustrates a overheat protection characteristic of the electric power steering device according to Embodiment 3 of the present invention.

Hereinbelow, the operation of the electric power steering device according to Embodiment 3 will be described in reference of the flow chart illustrated in FIG. 8. Same numerical references are used for steps of the operation similar to those in Embodiment 1.

Steps S1 and S2, and Steps S5 through S9 are similar to those in Embodiment 1, and description of these portions is omitted. In Step S4, a first-order lag I_lpf of a power function of the motor current is operated by the following equation.

$$I\_lpf(k)=I\_lpf(k-1)+C5* (Ia(k-1)^n-I\_lpf(k-1)), \quad \text{(Equation 11)}$$

where C5 denotes an arbitrary constant, and Ia(k−1) denotes a previous target current.

In Equation 11, $Ia(k-1)^n$ may be held in ROM as a data table, or operated using a polynomial approximation.

Further, the motor current upper limit value Imax is obtained from the first-order lag I_lpf of the power function of the motor current in accordance with, for example, a characteristic illustrated in FIG. 9.

A reason why the first-order lag is provided will be explained. In Embodiments 1 and 2, an appropriate time lag is set between the application of the motor current and the reduction of the motor current upper limit value by integrating the reducing rate. When the motor current upper limit value is positively obtained from the motor current in Embodiment 3, the motor current is immediately reduced when a large current is applied, whereby there is a danger that a steering assisting force is not maintained at time of, for example, the stationary steering. Therefore, the motor current upper limit value is calculated while applying a predetermined time lag to the power function of the motor current. Therefore, an appropriate steering force can be maintained at time of the stationary steering and so on.

In Embodiment 3, not only effects similar to those in Embodiments 1 and 2 are obtainable, but also the calculation is further simplified in comparison with Embodiment 2. Further, it becomes easy to set a periodical characteristic of the motor current upper limit value.

Embodiment 4

Only one type of the overheat protection characteristic of the motor current is used in Embodiments 1 through 3. A plurality of overheat protection characteristics are switched in Embodiment 4.

Figure 10:
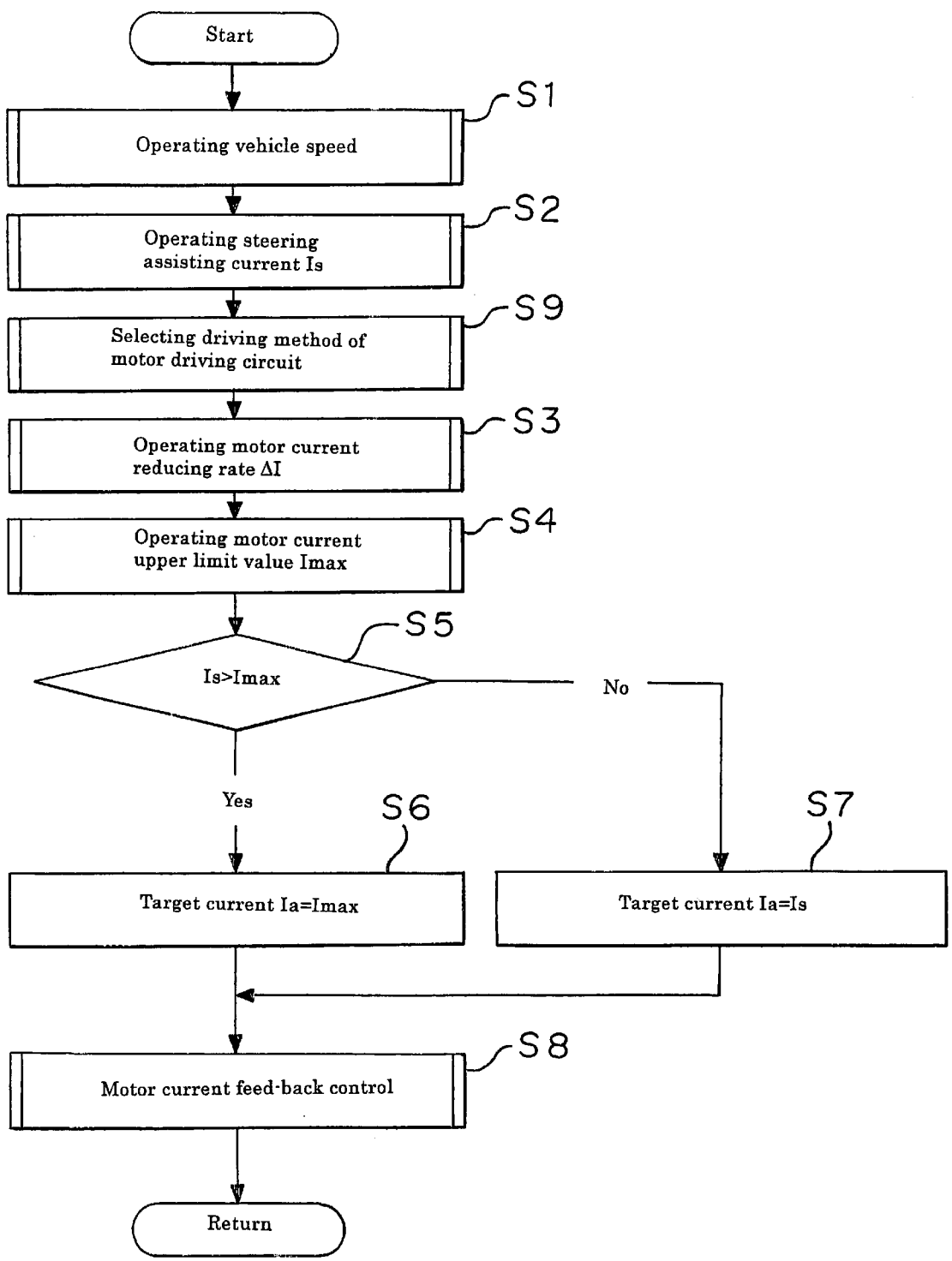
FIG. 10 is a flow chart illustrating an operation of a software for an electric power steering device according to Embodiment 4 of the present invention.

FIG. 10 is a flow chart illustrating operation of software of an electric power steering device according to Embodiment 4 of the present invention.

Figure 11:
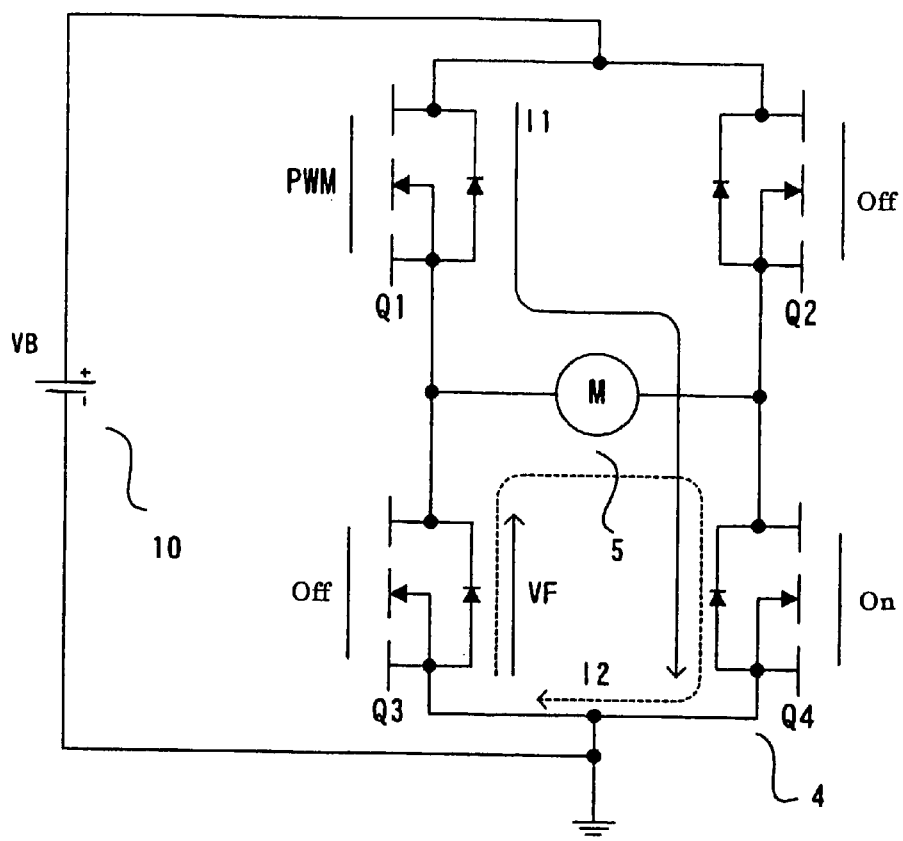
FIG. 11 illustrates a motor driving circuit of an electric power steering controller according to Embodiment 4 of the present invention.

FIG. 11 illustrates a motor driving circuit of an electric power steering controller according to Embodiment 4 of the present invention.

In FIG. 11, numerical reference 4 designates the motor driving circuit including MOSFET Q1 to Q4; numerical reference 5 designates a motor; and numerical reference 10 designates a battery outputting a voltage VB. Reference VF designates a voltage in a direction of easy flow of a parasitic diode of MOSFET. Numerical references I1 and I2 designate flow paths of the motor current.

Figure 12:
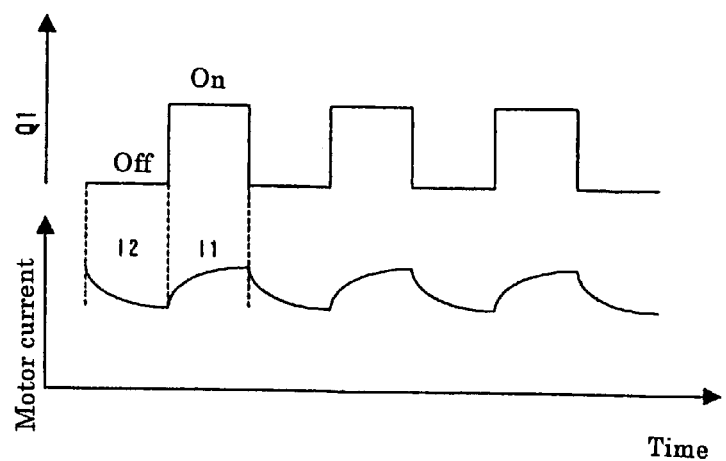
FIG. 12 is a graph illustrating waveforms of an electric current in the motor driving circuit illustrated in FIG. 11.

FIG. 12 illustrates a waveform of the current through the motor driving circuit illustrated in FIG. 11.

Figure 20:
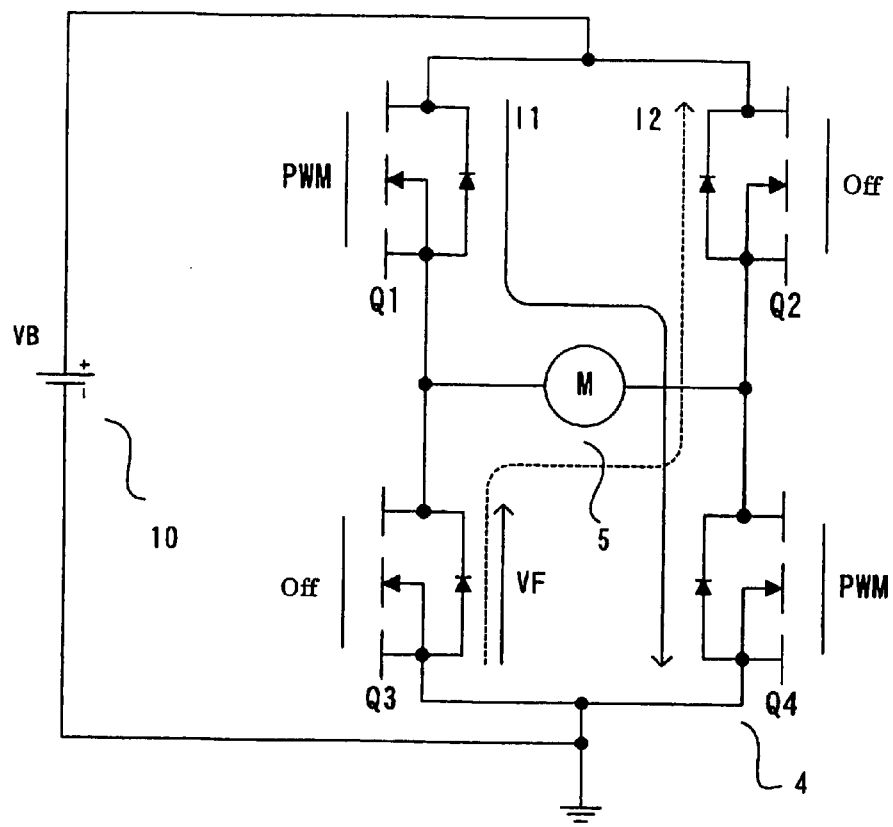
FIG. 20 illustrates the motor driving circuit of the conventional electric power steering controller.
Figure 21:
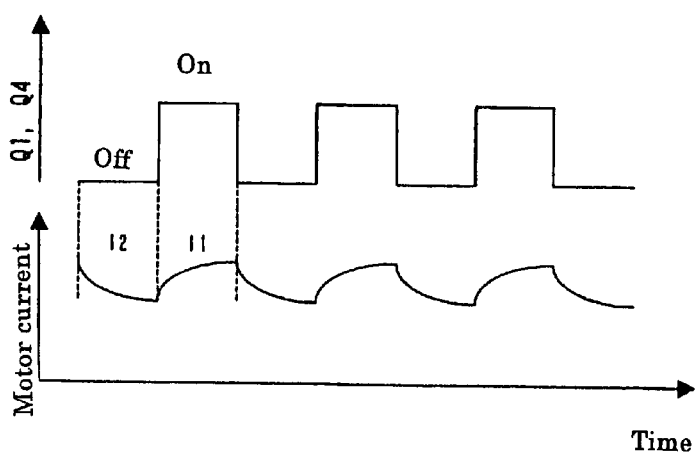
FIG. 21 illustrates a waveform of the current flowing through the motor driving circuit illustrated in FIG. 20.
Figure 22:
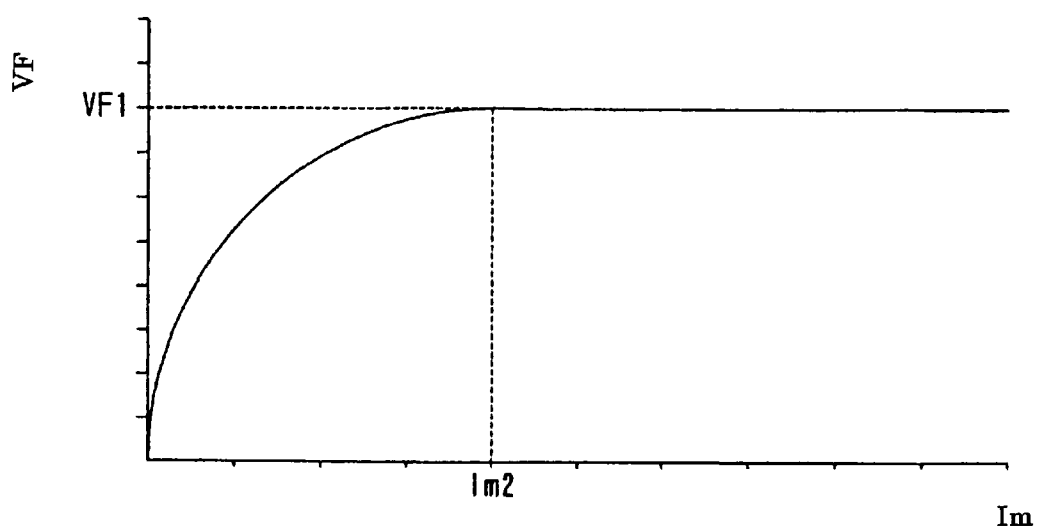
FIG. 22 is a graph illustrating the voltage drop in the parasitic diode of MOSFET of the motor driving circuit in the conventional electric power steering device.

When a bridge circuit is used as the motor driving circuit 4, there are many driving methods. FIG. 20 is an example of the driving method, wherein a pair of upper and lower switching elements in a flowing direction are subjected to pulse width modulation ("PWM") driving, and another pair of upper and lower switching elements are turned off. Hereinbelow, this driving method is referred to as upper and lower PWM driving. FIG. 21 illustrates a motor current waveform in the upper and lower PWM driving.

Another method illustrated in, for example, FIGS. 11 and 12, is also known, wherein an upper side of a pair of switching elements in a flowing direction is subjected to PWM driving, and a lower side of the pair of switching elements is turned on, and the other pair of switching elements on upper and lower sides are turned off. Hereinbelow, this driving method is referred to as single-sided PWM driving. The driving methods for bridge circuits respectively have advantages and disadvantages. An electric power steering device using a plurality of driving methods and changing over the driving methods is also known.

On the other hand, driving methods of the motor driving circuit 4 make a loss of the motor driving circuit 4 different. For example, in the upper and lower PWM driving, in comparison with the single-sided PWM driving, a switching loss is large, and heat is also strong. Accordingly, in the electric power steering device using the plurality of driving methods by switching the plurality of driving methods, it is desirable to change overheat protection characteristics over.

In Embodiment 4, an example that a plurality of driving methods of a bridge circuit and a plurality of overheat protection characteristics are changed over is described.

Meanwhile, a structure of hardware of the electric steering controller is the same as those described in Embodiments 1 through 3. Therefore, description of the structure is omitted, and only a method of operating a motor current upper limit value will be described.

Hereinbelow, the operation in Embodiment 4 will be described in reference of the flow chart illustrated in FIG. 10. Same numerical references are used for steps similar to those in Embodiment 1.

Steps S1 and S2 are the same as those in Embodiment 1, and repetitive description is omitted. In Step S9, the driving methods for the motor driving circuit are selected in accordance with a predetermined algorithm.

Next, in Steps S3 and S4, the motor current upper limit value is determined in accordance with Equations 7 through 9. At this time, in response to the driving method selected in Step S9, a constant C3 determining a motor current reducing rate, a motor current reference value Iref, and an index n of an exponent function is changed over. For example, when the upper and lower PWM driving is selected, because a loss is large, the constant C3 is increased and the motor current reference value Iref is decreased so that the motor current upper limit value is rapidly and gradually reduced to a small current.

Further, when the single-sided PWM driving is selected, because the loss is small, the constant C3 is decreased and the motor current reference value Iref is increased so that the current upper limit value slowly and gradually reduces to a large current.

Finally, in a similar manner to that in Embodiment 1, the target motor current is limited to be the upper limit value, obtained in Steps S3 and S4, or less in Steps S5 through S7, and in Step S8, the motor 5 is driven by the driving method for the motor driving circuit, determined in Step S9.

In Embodiment 4, since the overheat protection characteristics are selected in response to the loss of the motor driving circuit 4, it is possible to use the hardware to achieve a limit approximate to its maximum performance.

Although, in Embodiment 4, the constant C3, the motor current reference value Iref, and the index n in Equations 7 through 9 are changed over, and the example of the method for changing over the constant C3 and the motor current reference value Iref are described, one of the constant C3, the motor current reference value Iref, and the index n may be changed over. In this case, a program is further simplified.

Further, Equations 7 through 9 in Embodiment 1 are used to operate the motor current upper limit value in Embodiment 4, the motor current upper limit value may be operated in a similar manner to those in Embodiments 2 and 3.

Embodiment 5

Although, in Embodiments 1 through 4, the motor current upper limit value is operated mainly from the motor current, a temperature of a predetermined portion of an electric power steering device and a periphery thereof is detected, and the motor current upper limit value is operated from the motor current and the detected temperature in Embodiment 5.

Figure 13:
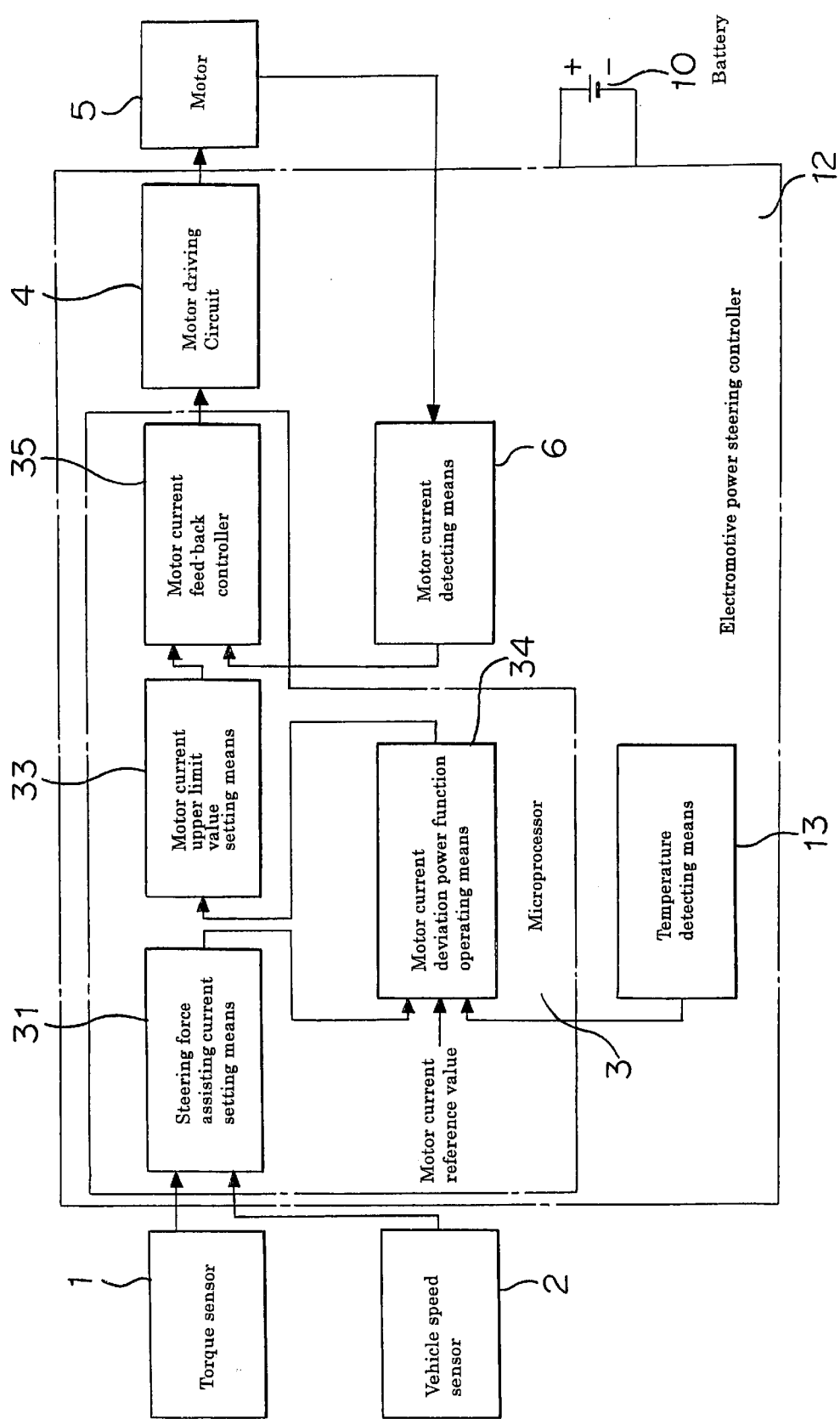
FIG. 13 schematically illustrates a structure of an electric power steering device according to Embodiment 5 of the present invention.

FIG. 13 schematically illustrates a structure of the electric power steering device according to Embodiment 5 of the present invention.

In FIG. 13, numerical references 1 through 6, 10, 12, 31, and 33 through 35 designate portions the same as those in FIG. 1. Numerical reference 13 designates a temperature detecting means located inside an electric power steering controller 12.

Figure 14:
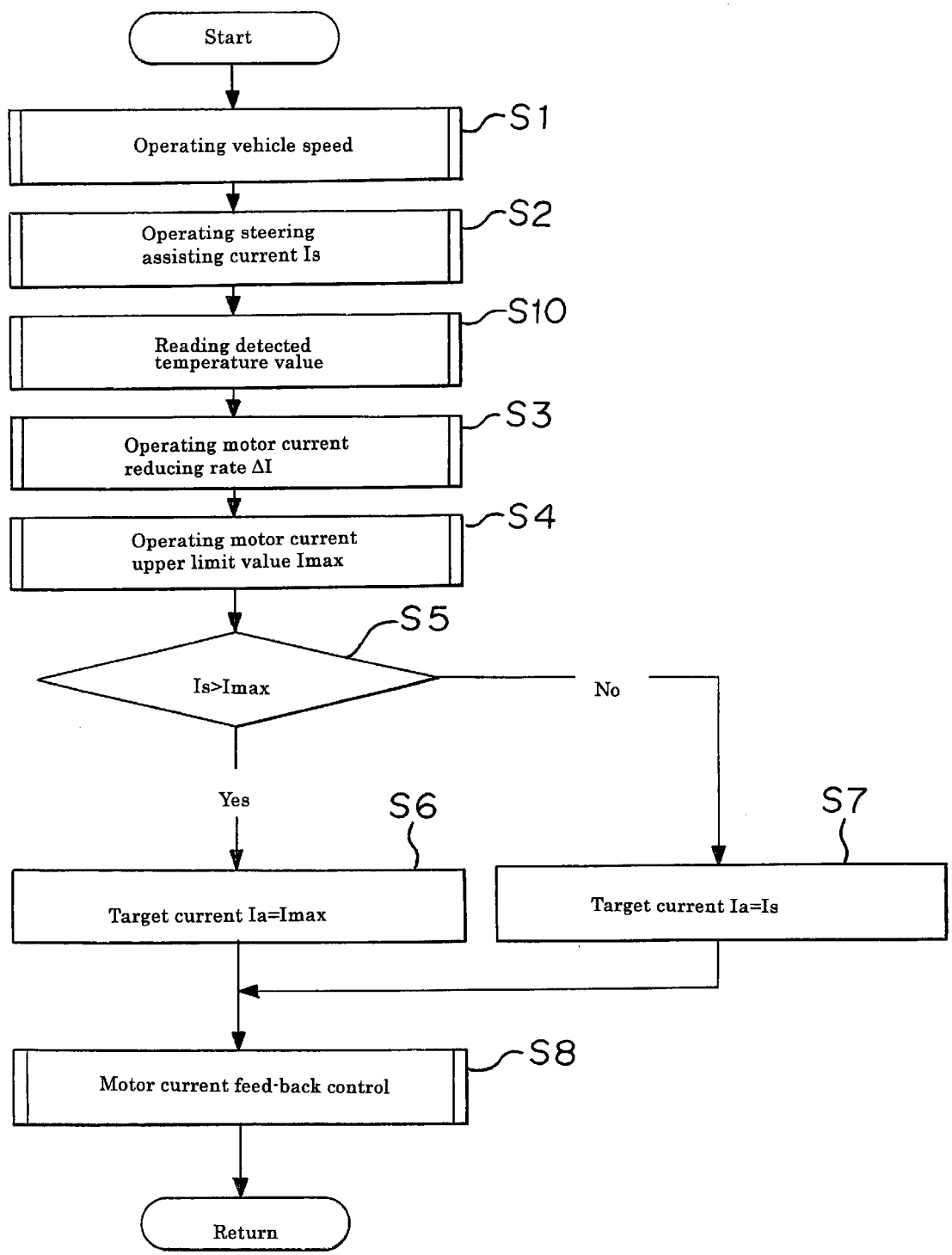
FIG. 14 is a flow chart illustrating an operation of software for the electric power steering device according to Embodiment 5 of the present invention.

FIG. 14 is a flow chart illustrating an operation of software for the electric power steering device according to Embodiment 5 of the present invention.

Next, the operation according to Embodiment 5 will be described in reference of the flow chart illustrated in FIG. 14.

Steps S1 and S2 are similar to those in Embodiment 1, and description of these is omitted. In Step S10, the detected temperature value is read by the temperature detecting means 13.

In Steps S3 and S4, in a similar manner to that in Embodiment 1, the motor current upper limit value is obtained in accordance with Equations 7 through 9. At this time, a constant C3 for determining a motor current reducing rate, a motor current reference value Iref, and an index of exponent function n are changed over in response to a detected temperature value read in Step S10. For example, when a high temperature is detected, it is necessary to rapidly reduce a motor current upper limit value Imax to protect from overheat. Therefore, the constant C3 is increased and the motor current reference value Iref is decreased. Further, when a low temperature is detected, because there is a margin in the temperature, the constant C3 is decreased and the motor current reference value Iref is increased so that the current upper limit value is not gradually reduced.

Finally, in a similar manner to that in Embodiment 1, the target motor current is limited to be the upper limit value, obtained in Steps S3 and S4, or less in Steps S5 through S7. In Step S8, a motor 5 is driven in accordance with a driving method for a motor driving circuit determined in Step S9.

In Embodiment 5, because an overheat protection characteristic is selected in response to the detected temperature, it is possible to use hardware to obtain a limit approximate to its maximum performance.

Although, in Embodiment 5, the constant C3, the motor current reference value Iref, and the index n of Equations 7 through 9 are changed over, and the example of the method of changing the constant C3 and the motor current reference value Iref over is described, only one of the constant C3, the motor current reference value Iref, the index n may be changed over. In this case, a program is further simplified.

Further, although Equations 7 through 9 described in Embodiment 1 are used to operate the motor current upper limit value in Embodiment 5, the motor current upper limit value may be operated in a similar manner to those in Embodiments 2 and 3.

Further, although, in Embodiment 5, the temperature is measured when the electric power steering is operated, and the reducing rate is increased or the motor current upper limit value is decreased at the time of the high temperature, the temperature may be measured only at the time of starting the electric power steering controller 12 and a characteristic of gradually reducing the motor current may be determined in response to a measured value in accordance with a working condition. In this structure, because the temperature can be measured without an influence of self-heat of the electric power steering controller 12, it is possible to obtain the measured value approximate to a temperature in a cabin of a vehicle.

Further, although, in Embodiment 5, a temperature detector 13 is installed in the electric power steering controller 12 to measure a temperature inside the electric power steering controller 12 and a periphery thereof, the temperature detector may be located in the vicinity of the motor 5 to measure the temperature inside the motor and a vicinity thereof. This structure is effective when the motor 5 reaches a temperature limit before the electric power steering controller 12 reaches its temperature limit.

Embodiment 6

Although, in Embodiments 1 through 5, only one type of the motor current upper limit value is operated, for example, it is possible to adopt a structure that a motor current upper limit value is operated for each portion requiring a overheat protection and select one of a plurality of motor current upper limit values by a predetermined method. Embodiment 6 uses this structure.

Figure 15:
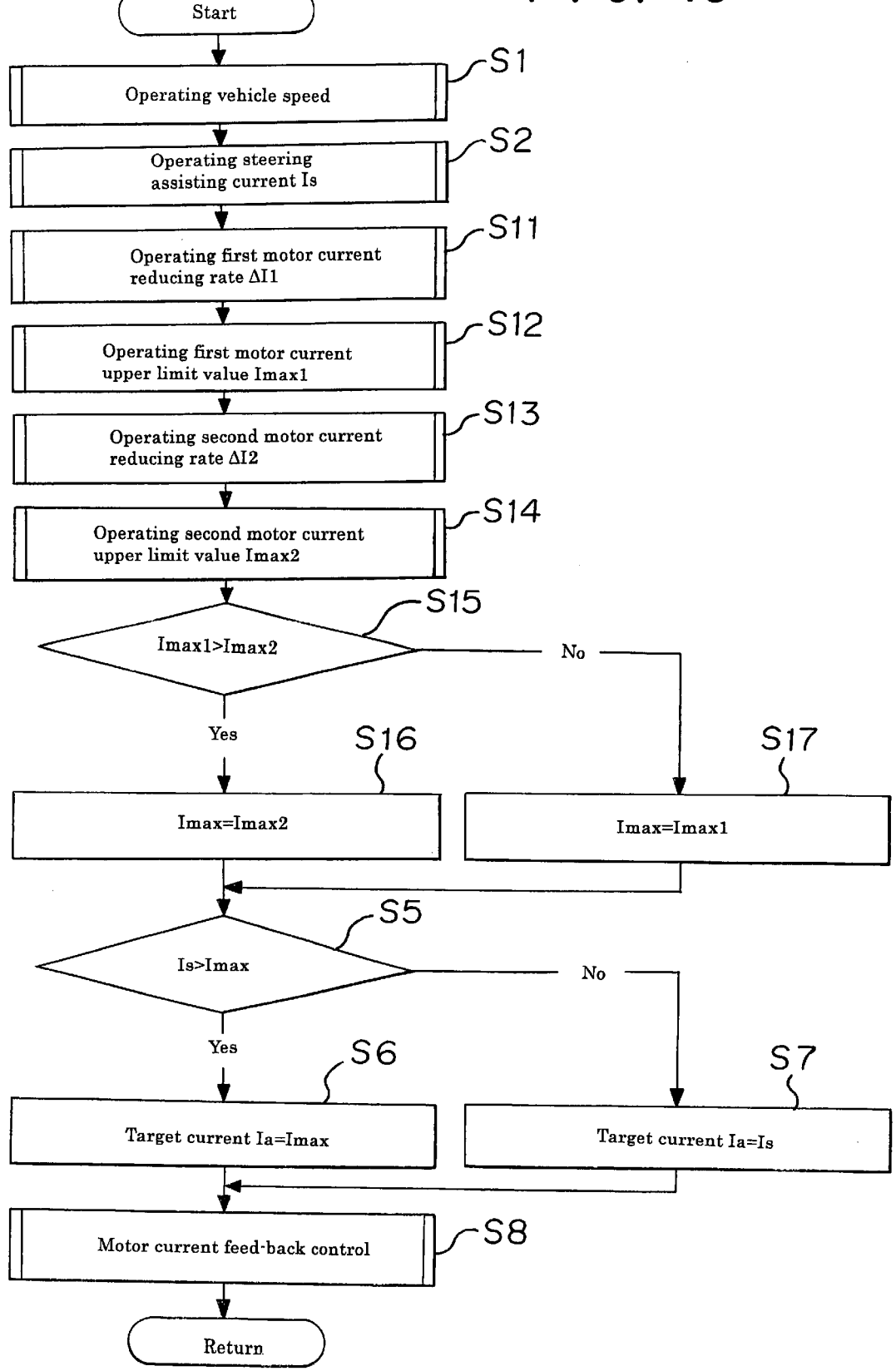
FIG. 15 is a flow chart illustrating an operation of a software for an electric power steering device according to Embodiment 6 of the present invention.
Figure 16:
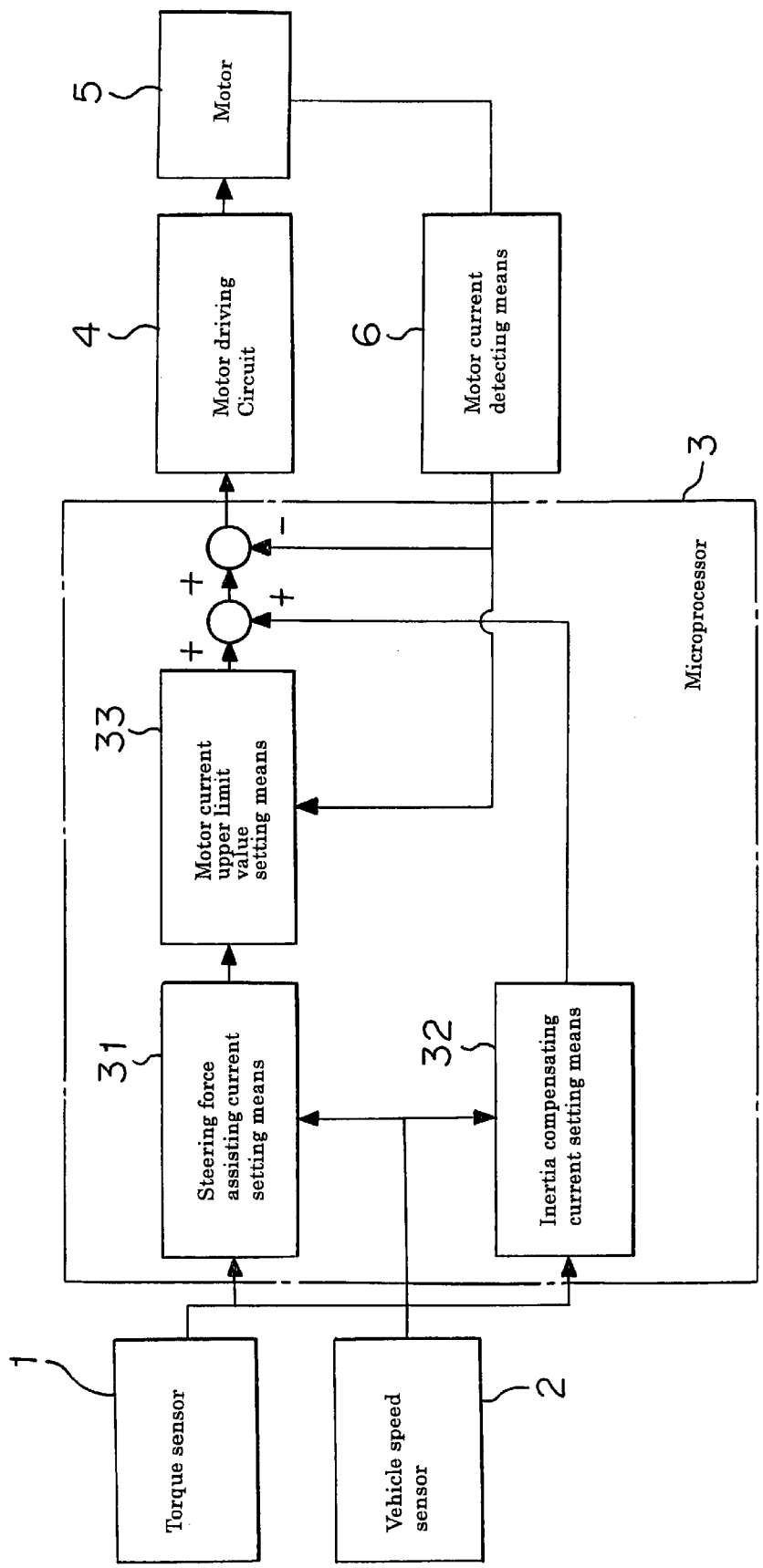
FIG. 16 is a control block chart illustrating the conventional electric power steering device.
Figure 17:
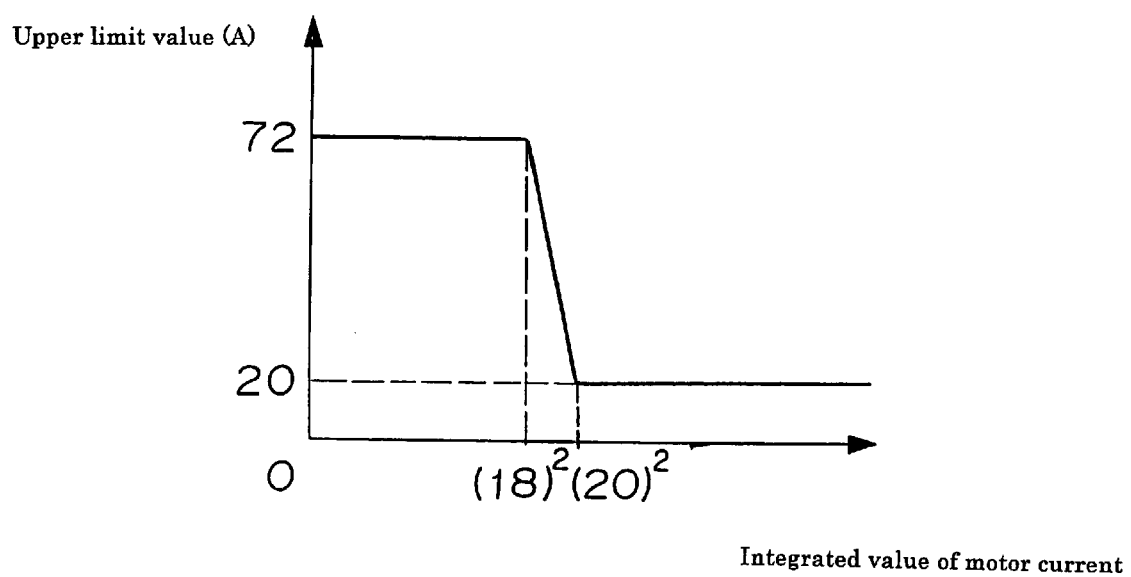
FIG. 17 is a graph illustrating the upper limit value of the current in the conventional electric steering device.
Figure 18:
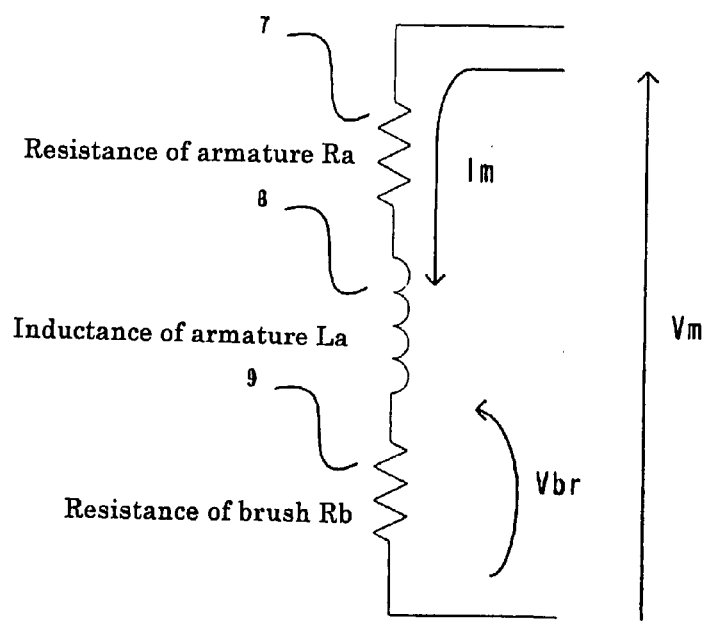
FIG. 18 is an equivalent circuit of a generally used d.c. motor.
Figure 19:
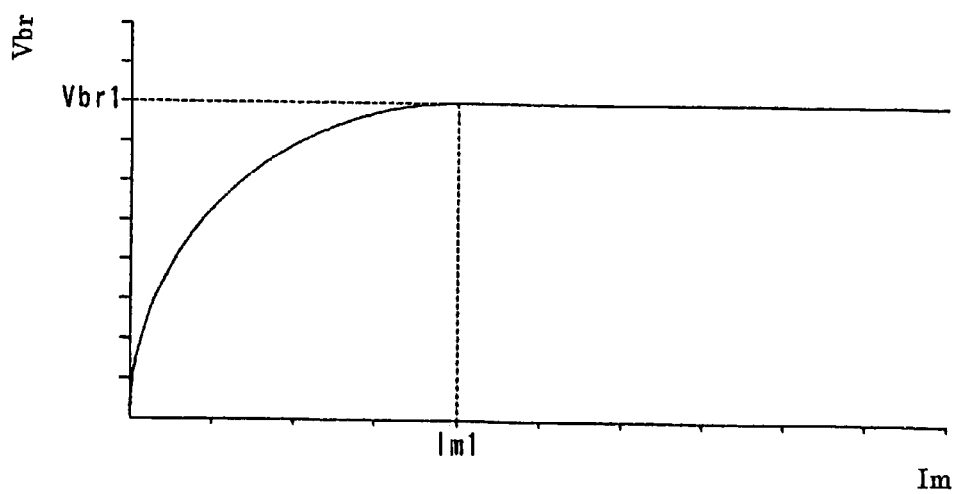
FIG. 19 is a graph illustrating the voltage drop of the brushes in the d.c. motor illustrated in FIG. 18.

FIG. 15 illustrates a flow chart explaining an operation of software for an electric power steering device according to Embodiment 6 of the present invention.

Hereinbelow, the operation according to Embodiment 6 will be described in reference of the flow chart illustrated in FIG. 15. The same numerical references are used for operational steps similar to those in Embodiment 1. Further, because a structure of hardware is the same as that in Embodiment 1, description of this is omitted.

Steps S1 and S2 are processed in a similar manner to that in Embodiment 1. Succeedingly, in Steps S11 and S12, for example, a constant C3 appropriate to an overheat protection for an electric power steering controller 12, a motor current reference value Iref, and an index of exponent function n are applied to Equations 7 through 9 to operate a first motor current upper limit value Imax1. In the next, in Steps S13 and S14, for example, a constant appropriate to an overheat protection for a motor 5, a motor current reference value Iref, and an index n of exponent function are applied to Equations 7 through 9 to operate a second motor current upper limit value Imax2.

In Steps S15 through S17, a smaller upper limit value between the motor current upper limit values Imax1 and Imax2, obtained in Steps S11 through S14, is selected as a motor current upper limit value Imax for the electric power steering device. Thereafter, Steps S5 through S8 are processed in a similar manner to that in Embodiment 1.

In Embodiment 6, because an overheat protection characteristic in response to a heating portion of the electric power steering device is selected, it is possible to use the hardware to generate a limit approximate to its maximum performance.

In Embodiment 6, one is selected from two types of the overheat protection characteristics. However, if one is selected from the overheat characteristics of three types or more, it is possible to further minutely set the overheat protection characteristic. For example, overheat protection characteristics may be set for each component such as an armateur, a commutator, respectively of the motor 5, a motor driving circuit 4 of the electric power steering controller 12, and a microprocessor 3.

Further, although, in Embodiment 6, the motor current upper limit value is obtained in accordance with Equations 7 through 9 disclosed in Embodiment 1, the motor current upper limit value may be operated in a similar manner to those in Embodiments 2 through 5, or other equations may be combined. Further, when a plurality of motor current upper limit values are operated, a plurality of reducing characteristics may be set by changing any of the constants.

The first advantage of the electric power steering device according to the present invention is that the steering assisting force can be applied while providing the appropriate overheat protection.

The second advantage of the electric power steering device according to the present invention is that the calculation can be simplified.

The third advantage of the electric power steering device according to the present invention is that the calculation is easily conducted because the power function can be subjected to the polynomial approximation.

The fourth advantage of the electric power steering device according to the present invention is that the overheat protection can be performed in response to the driving method of the motor driving circuit.

The fifth advantage of the electric power steering device according to the present invention is that the appropriate steering force can be maintained at the time of the stationary steering.

The sixth advantage of the electric power steering device according to the present invention is that the overheat protection can be conducted in response to the detected temperature.

The seventh advantage of the electric power steering device according to the present invention is that the further appropriate overheat protection can be conducted.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2000-134168 filed on May 8, 2000 including specification, claims, drawings and summary are incorporated herein by reference in its entirety.

What is claimed is:

1. An electric power steering device assisting a steering force by a motor, the electric power steering device comprising:

a motor current upper limit value setting means for setting an upper limit value of a motor current based on a power function of the motor current, wherein indices of an exponential function of the power function are in a range between 1 and 2.

2. The electric power steering device according to claim 1, wherein the power function is approximated by a polynomial expression or a polygonal line graph.

3. The electric power steering device according to claim 1, further comprising a motor driving circuit that drives the motor in a plurality of modes, wherein constants of the power function are switched in response to the driving modes of the motor driving circuit.

4. The electric power steering device according to claim 1, wherein the power function is delayed in time by a predetermined function to set the upper limit value of the motor current.

5. The electric power steering device according to claim 1 further comprising:

a temperature detecting means detecting temperatures of portions related to a temperature increment, wherein the motor current upper limit value setting means adjusts the upper limit value of the motor current in response to the temperatures detected by the temperature detecting means.

6. The electric power steering device according to claim 1, wherein the motor current upper limit value setting means operates a plurality of upper limit values of the motor current using a plurality of power functions, and selects one of the plurality of upper limit values of the motor current.

7. An electric power steering device assisting a steering force by a motor, the electric power steering device comprising:

a motor current upper limit value setting means for setting an upper limit value of a motor current based on a power function of a deviation between the motor current and a motor current reference value.

8. The electric power steering device according to claim 7, wherein indices of an exponent of the power function are in a range between 1 and 2.

9. The electric power steering device according to claim 7, wherein the power function is approximated by a polynomial expression or a polygonal line graph.

10. The electric power steering device according to claim 7, further comprising a motor driving circuit that drives the motor in a plurality of modes, wherein constants of the power function are switched in response to the driving modes of the motor driving circuit.

11. The electric power steering device according to claim 7, wherein the power function is delayed in time by a predetermined function to set the upper limit value of the motor current.

12. The electric power steering device according to claim 7 further comprising:

a temperature detecting means detecting temperatures of portions related to a temperature increment, wherein the motor current upper limit value setting means adjusts the upper limit value of the motor current in response to the temperatures detected by the temperature detecting means.

13. The electric power steering device according to claim 7, wherein the motor current upper limit value setting means operates a plurality of upper limit values of the motor current using a plurality of power functions, and selects one of the plurality of upper limit values of the motor current.

14. An electric power steering device assisting a steering force by a motor, the electric power steering device comprising:

a motor current upper limit value setting means for setting an upper limit value of a motor current based on a deviation between a power function of the motor current and a reference value of the power function of the motor current.

15. The electric power steering device according to claim 14, wherein indices of exponents of the power functions are in a range between 1 and 2.

16. The electric power steering device according to claim 14, wherein the power functions are approximated by polynomial expressions, polygonal line graphs, or a combination thereof.

17. The electric power steering device according to claim 14, further comprising a motor driving circuit that drives the motor in a plurality of modes, wherein constants of the power functions are switched in response to the driving modes of the motor driving circuit.

18. The electric power steering device according to claim 14, wherein the power functions are delayed in time by predetermined functions to set the upper limit value of the motor current.

19. The electric power steering device according to claim 14 further comprising:

a temperature detecting means detecting temperatures of portions related to a temperature increment, wherein the motor current upper limit value setting means adjusts the upper limit value of the motor current in response to the temperatures detected by the temperature detecting means.

20. The electric power steering device according to claim 14, wherein the motor current upper limit value setting means operates a plurality of upper limit values of the motor current using a plurality of power functions, and selects one of the plurality of upper limit values of the motor current.

* * * * *